United States Patent
Pinsenschaum et al.

(10) Patent No.: US 7,618,057 B2
(45) Date of Patent: Nov. 17, 2009

(54) SIDE CURTAIN AIRBAG WITH EXTENDED SHOULDER PORTION

(75) Inventors: Ryan T. Pinsenschaum, Dayton, OH (US); Douglas S. Weston, Tipp City, OH (US); Mark T. Winters, Troy, OH (US); Mike F. Fink, Mesa, AZ (US); William Abney, III, Richmond, IN (US); Jeffrey A. Welch, Washington Township, MI (US); Dayne B. Hassett, Centerville, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/779,114

(22) Filed: Jul. 17, 2007

(65) Prior Publication Data

US 2008/0012275 A1    Jan. 17, 2008

Related U.S. Application Data

(60) Provisional application No. 60/831,424, filed on Jul. 17, 2006.

(51) Int. Cl.
*B60R 21/20* (2006.01)
(52) U.S. Cl. ............. 280/730.2; 280/729; 280/749
(58) Field of Classification Search ........... 280/730.2, 280/749, 729
See application file for complete search history.

(56) References Cited

U.S. PATENT DOCUMENTS

| | | | | |
|---|---|---|---|---|
| 5,324,072 A * | 6/1994 | Olson et al. | | 280/730.2 |
| 6,450,527 B2 * | 9/2002 | Kobayashi et al. | | 280/729 |
| 6,540,253 B2 * | 4/2003 | Acker et al. | | 280/730.2 |
| 6,695,341 B2 * | 2/2004 | Winarto et al. | | 280/730.2 |
| 6,758,492 B2 * | 7/2004 | Tesch | | 280/730.2 |
| 7,350,804 B2 * | 4/2008 | Bakhsh et al. | | 280/730.2 |
| 7,377,547 B2 * | 5/2008 | Schimpff et al. | | 280/743.1 |
| 2004/0046366 A1 * | 3/2004 | Ochiai et al. | | 280/728.2 |
| 2005/0189743 A1 * | 9/2005 | Bakhsh et al. | | 280/730.2 |

* cited by examiner

*Primary Examiner*—Eric Culbreth
(74) *Attorney, Agent, or Firm*—Douglas D. Fekete

(57) ABSTRACT

An inflatable cushion for a side of a vehicle, the inflatable cushion, comprising: a primary cushion chamber inflatable to a first position, the primary cushion chamber having an upper edge portion, a lower edge portion, a first end portion and a second end portion; and a secondary cushion chamber inflatable to a second position, the secondary cushion chamber having a first section and a second section, the first section extending between the upper edge portion and the lower edge portion and the second section extending from the first section towards either the first end portion or the second end portion or towards both the first end portion or the second end portion and a portion of the second section being located below the lower edge portion when the secondary cushion chamber is in the second position.

29 Claims, 14 Drawing Sheets

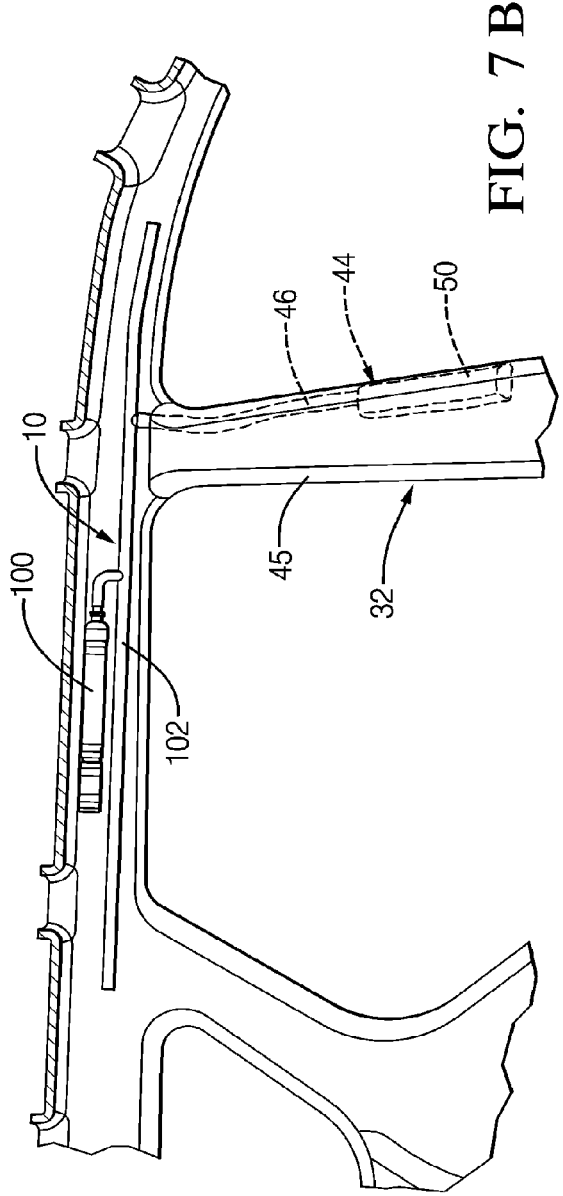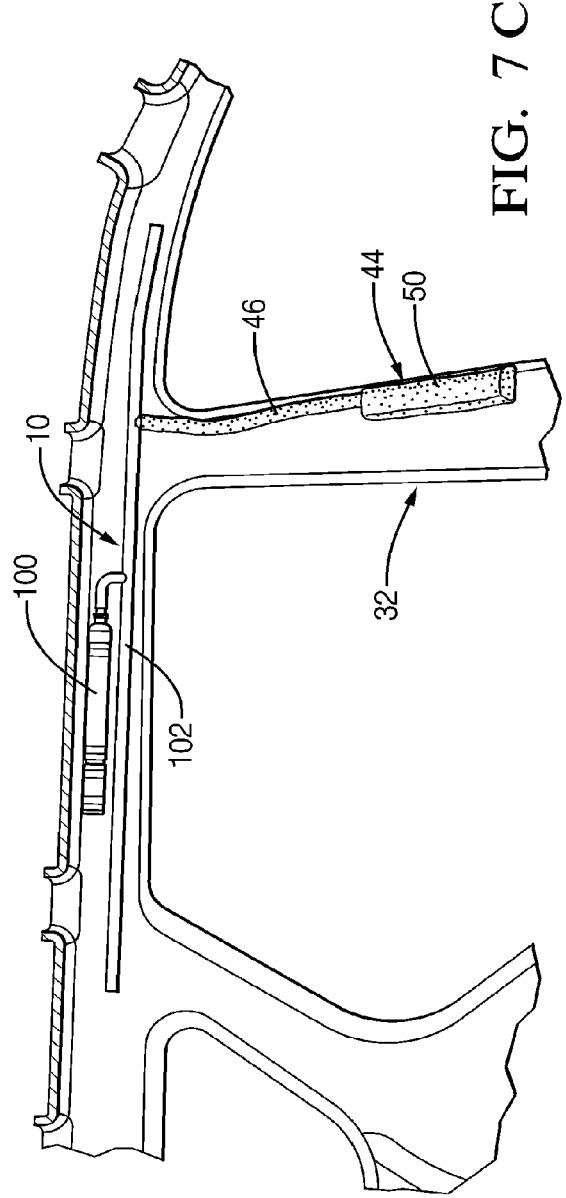

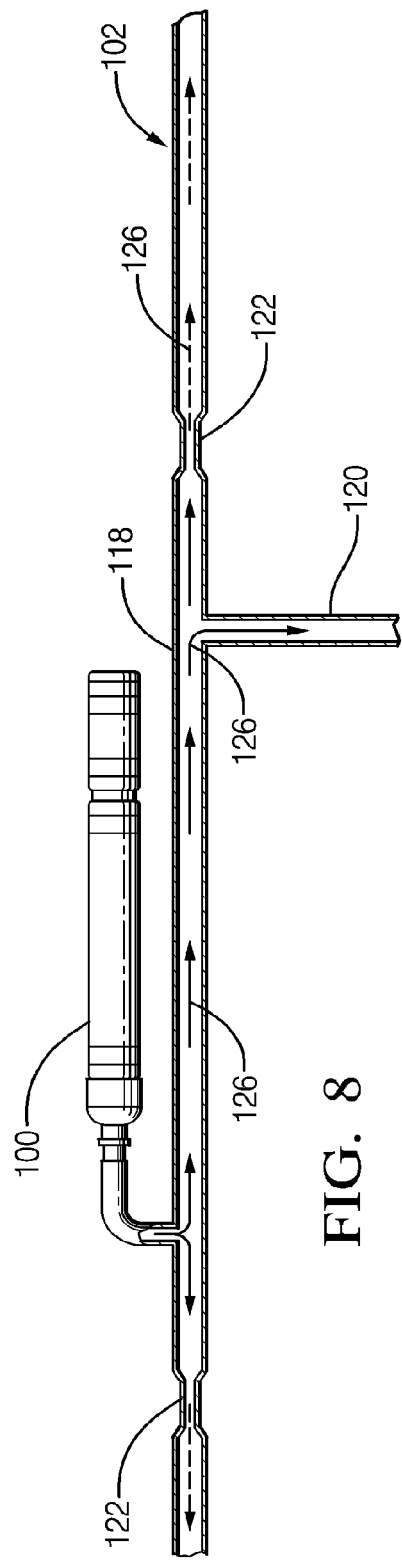
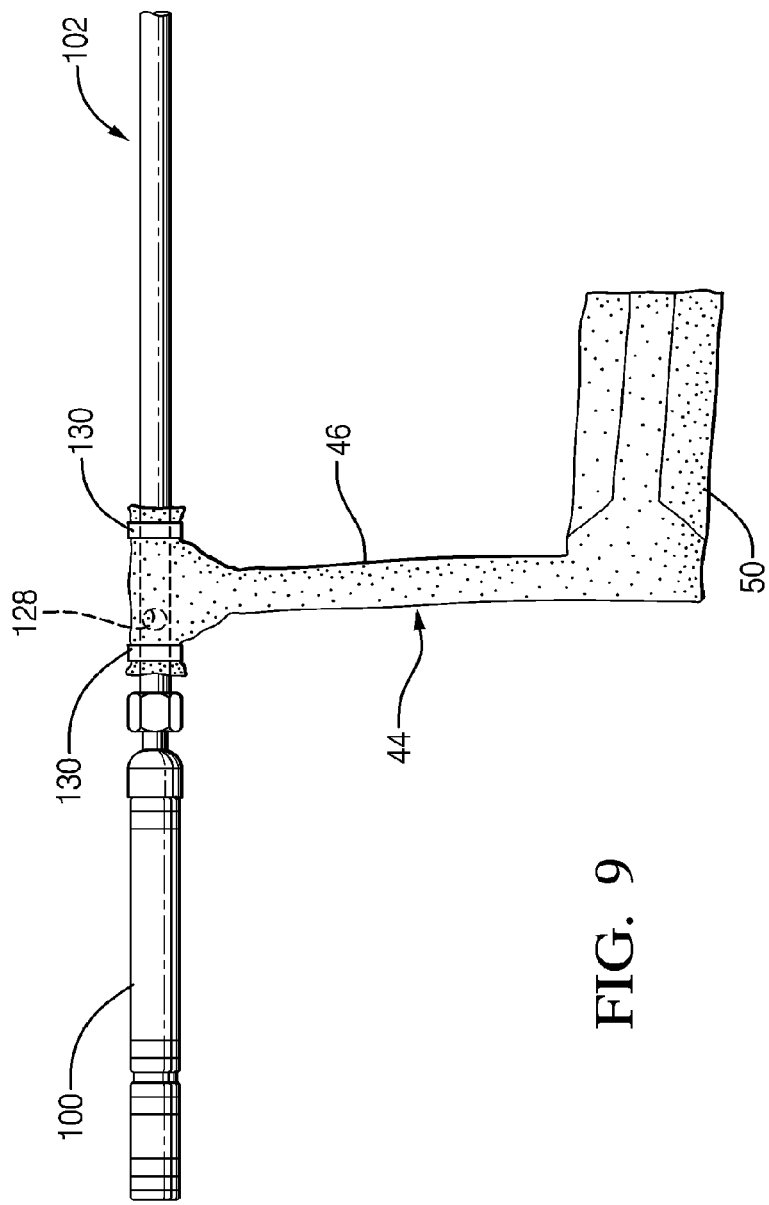
FIG. 8
FIG. 9

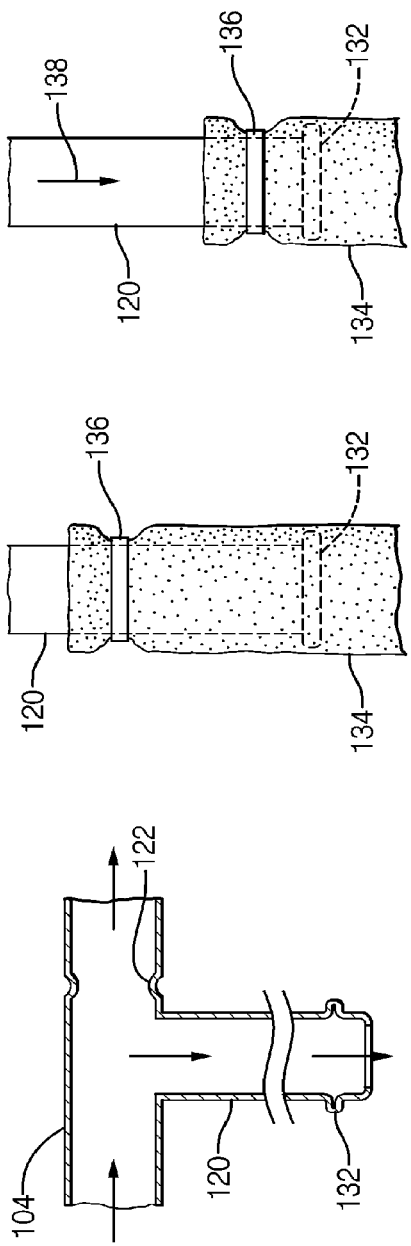
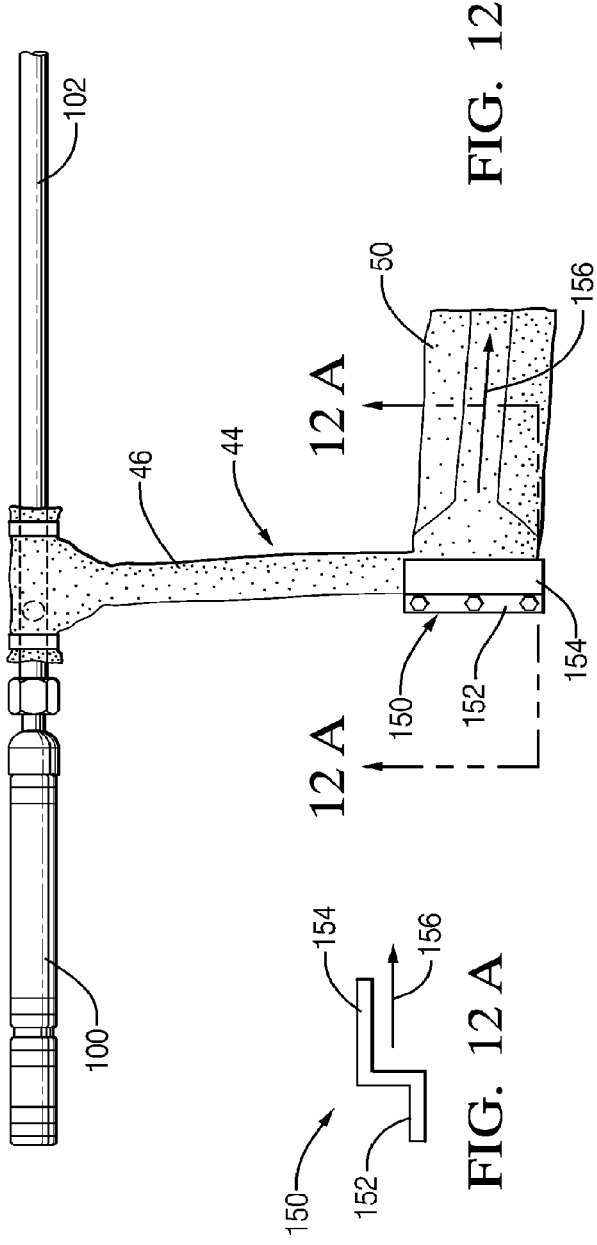

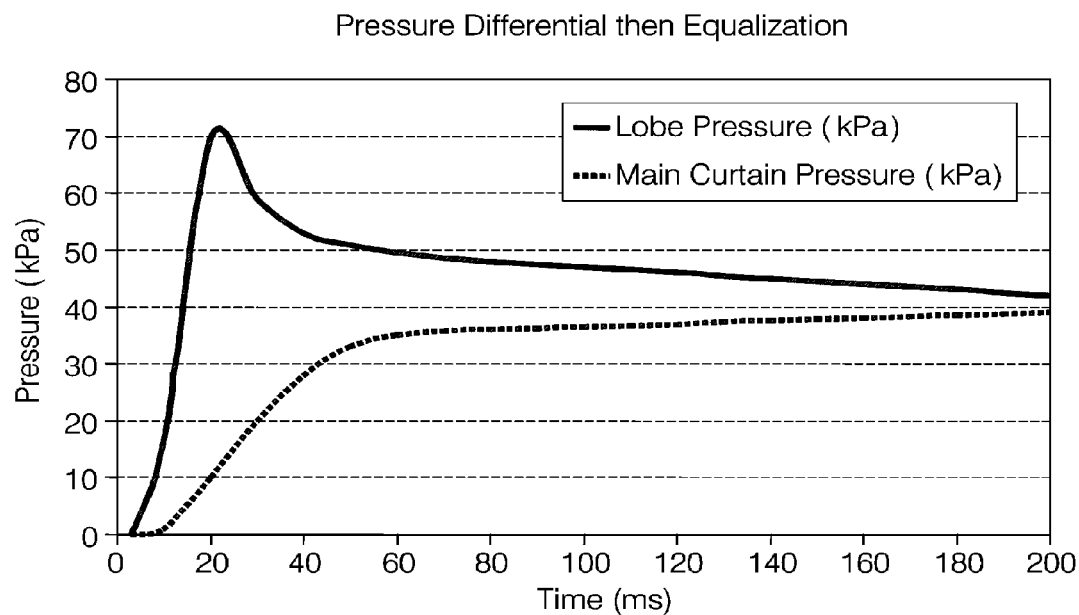
FIG. 15
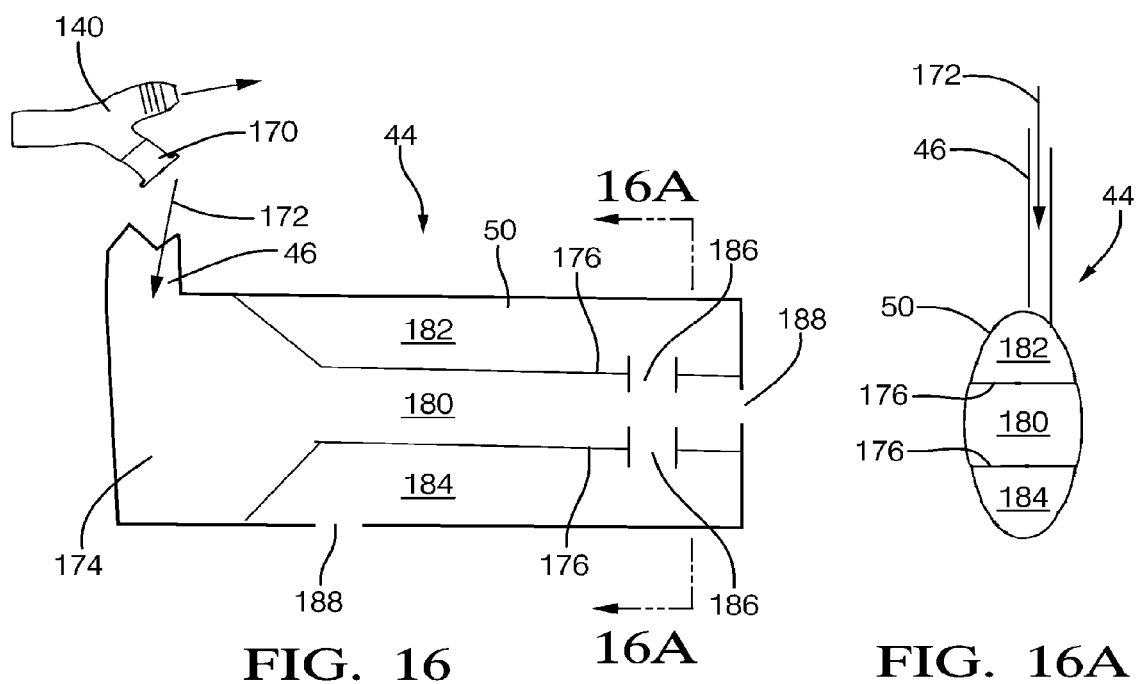
FIG. 16
FIG. 16A

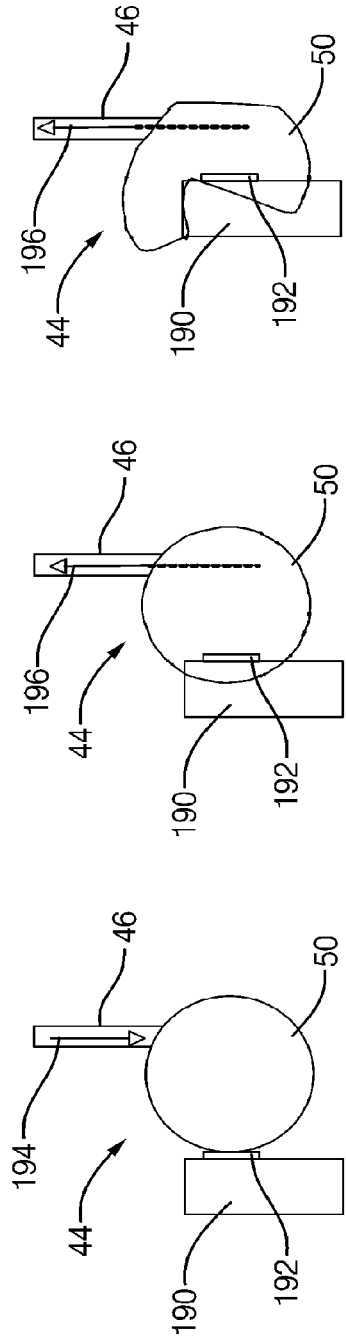
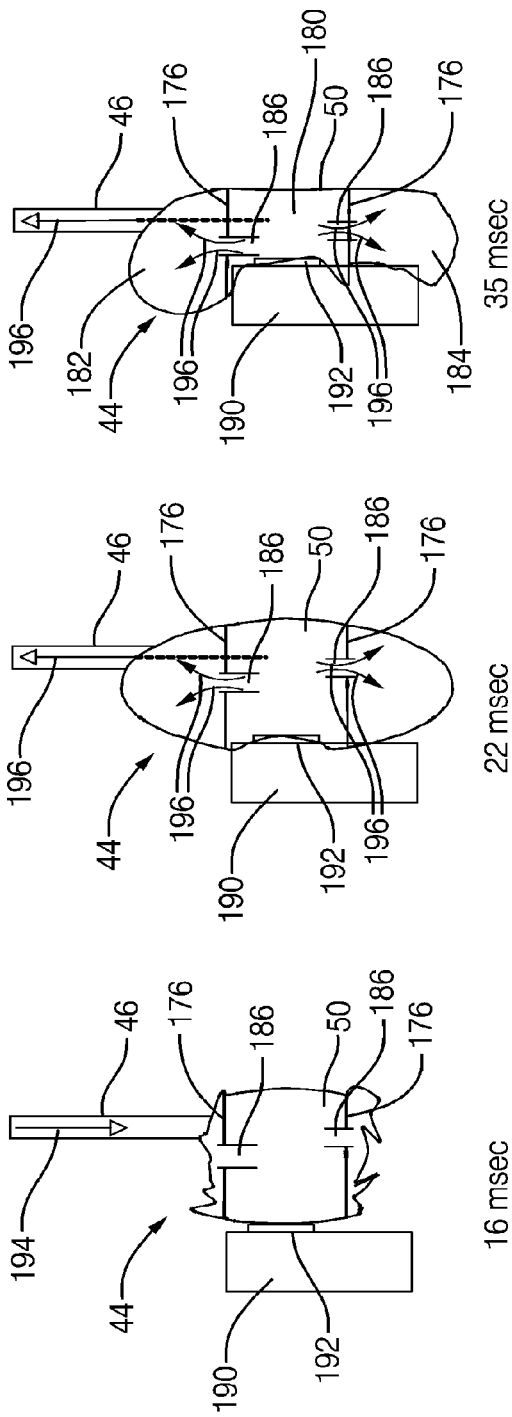

SIDE CURTAIN AIRBAG WITH EXTENDED SHOULDER PORTION

CROSS REFERENCE TO RELATED APPLICATIONS

This application claims the benefit of U.S. Provisional Patent Application Ser. No. 60/831,424 filed Jul. 17, 2006 the contents of which are incorporated herein by reference thereto.

BACKGROUND

Exemplary embodiments of the present invention relate generally to a side impact or rollover inflatable curtain airbag and more specifically to an inflatable curtain airbag for protecting the head and shoulder area of an occupant in a vehicle and methods of deploying the same.

Side impact or rollover airbags (also referred to as side curtains or curtain airbags) are used to provide a cushion between a side of a vehicle and the occupant; separate seat mounted airbags are also used to provide occupant protection. A roof rail mounted curtain airbag and a separate seat mounted airbag each provide distinct areas of deployment and protection. For example, the seat-mounted airbag is designed to protect the occupant's thorax/ribs and abdomen by providing inflated airbag interaction with the occupant's shoulder, shoulder and ribs, shoulder and pelvis, or shoulder, pelvis, and ribs. Seat mounted airbags have been designed to provide this protection by interacting with or "pushing" the occupant in an appropriate manner through load paths somewhat less susceptible to injury (or with a higher threshold to the onset of serious injury). These preferred load paths are through the shoulder and pelvis area of the occupant.

Factors involved in order to enable proper occupant protection include time, space, occupant loading distribution, and interaction with seatbelts being worn by the occupants. To protect the occupant, the airbags must deploy into the proper position at a predetermined time from the beginning of a deployment event.

Typically and for side impact protection an inflatable curtain airbag is used in conjunction with a seat-mounted airbag to meet desired deployment scenarios. However, and as may be expected there are a variety of items to consider when providing occupant protection with two independent inflatable cushions. Moreover, the use of two separate airbags requires duplication of the firing circuits which adds complexity and cost to the overall system.

Accordingly, it is desirable to provide a side impact or rollover restraint system having an inflatable curtain airbag that reduces vehicle development complexity, reduces vehicle build complexity, improves cost effectiveness, and overcomes the issues discussed above. Additionally, a system is desirable that provides improved component capacities to support emerging technologies and markets, potential for improved seat comfort, improved opportunity for seat covering changes within a vehicle program life, and simplified electrical harnesses and electronics.

SUMMARY OF THE INVENTION

Thus in accordance with exemplary embodiments of the present invention there is provided an airbag module or system including a two-chamber inflatable cushion that operates in a gas-efficient manner.

In one exemplary embodiment, an inflatable cushion for a side of a vehicle is provided, the inflatable cushion, comprising: a primary cushion chamber inflatable to a first position, the primary cushion chamber having an upper edge portion, a lower edge portion, a first end portion and a second end portion; and a secondary cushion chamber inflatable to a second position, the secondary cushion chamber having a first section and a second section, the first section extending between the upper edge portion and the lower edge portion and the second section extending from the first section towards either the first end portion or the second end portion or towards both the first end portion or the second end portion and a portion of the second section being located below the lower edge portion when the secondary cushion chamber is in the second position.

In another exemplary embodiment, an airbag module for a vehicle is provided the airbag module, comprising: an inflatable cushion having a primary cushion chamber inflatable to a first position, the primary cushion chamber having an upper edge portion, a lower edge portion, a first end portion and a second end portion; and a secondary cushion chamber inflatable to a second position, the secondary cushion chamber having a first section and a second section, the first section extending between the upper edge portion and the lower edge portion and the second section extending from the first section towards either the first end portion or the second end portion or towards both the first end portion or the second end portion and a portion of the second section being located below the lower edge portion when the secondary cushion chamber is in the second position; an inflator for inflating the inflatable cushion.

In another exemplary embodiment, a method of providing side protection to an occupant of a vehicle is provided, the method comprising: inflating an inflatable cushion with a single source of inflation, the inflatable cushion having a primary cushion chamber inflatable to a first position, the primary cushion chamber having an upper edge portion, a lower edge portion, a first end portion and a second end portion; and a secondary cushion chamber inflatable to a second position, the secondary cushion chamber having a first section and a second section, the first section extending between the upper edge portion and the lower edge portion and the second section extending from the first section towards either the first end portion or the second end portion or towards both the first end portion or the second end portion and a portion of the second section being located below the lower edge portion when the secondary cushion chamber is in the second position.

BRIEF DESCRIPTION OF THE DRAWINGS

FIGS. 7A-7C illustrate an alternative exemplary embodiment of the present invention;

FIG. 8 illustrates portions of a diffuser tube contemplated for use in exemplary embodiment of the present invention;

FIG. 9 illustrates another alternative exemplary embodiment of the present invention;

FIGS. 10A-10C illustrate yet another alternative exemplary embodiment of the present invention;

FIGS. 12-12A illustrate still another alternative exemplary embodiment of the present invention;

FIG. 15 is a graph illustrating a plot of the internal pressure of a shoulder lobe cushion or secondary cushion chamber in accordance with an exemplary embodiment vs. a plot of the internal pressure of a curtain airbag or primary cushion chamber in accordance with an exemplary embodiment of the present invention;

FIGS. 16 and 16A illustrate a shoulder lobe cushion or secondary cushion chamber in accordance with an alternative exemplary embodiment of the present invention;

FIGS. 17A-17C illustrate a shoulder lobe cushion or secondary cushion chamber in accordance with another alternative exemplary embodiment of the present invention; and FIGS. 18A-18C illustrate a shoulder lobe cushion or secondary cushion chamber in accordance with another alternative exemplary embodiment of the present invention.

DETAILED DESCRIPTION OF EXEMPLARY EMBODIMENTS

Figure 1:
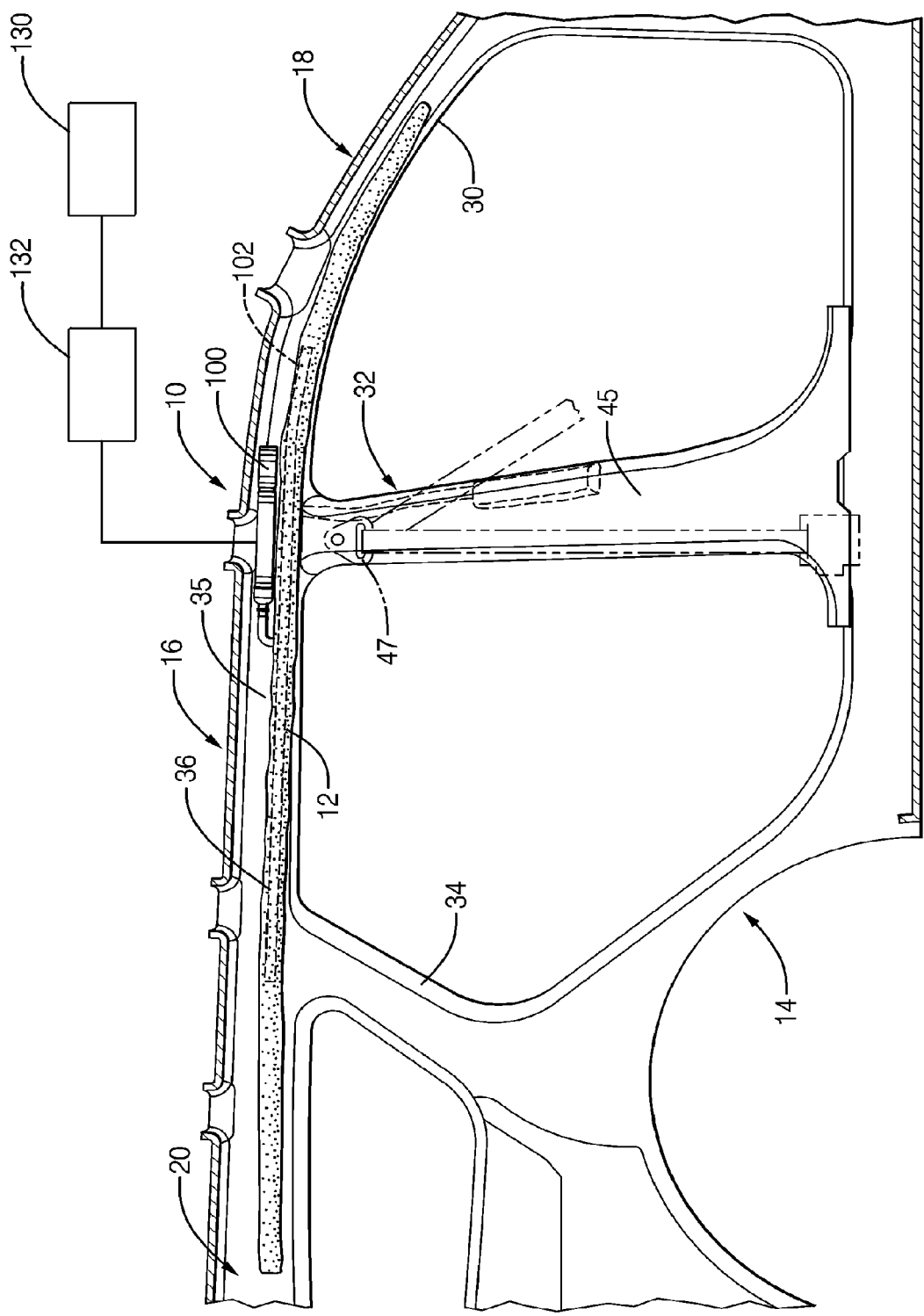
FIG. 1 illustrates a curtain airbag system used within a vehicle in accordance with an exemplary embodiment of the present invention.

The exemplary embodiments of the present invention are directed to an inflatable curtain airbag or inflatable cushion, and more particularly to a curtain airbag that includes a primary cushion chamber and a secondary cushion chamber, wherein the secondary cushion chamber provides coverage to the shoulder, shoulder area, torso and/or pelvis area of an occupant located proximate to the primary cushion chamber. In one exemplary embodiment, the primary cushion chamber and the secondary cushion chamber are inflated from the same inflator or inflation source during activation or deployment of the curtain airbag or inflatable cushion. Exemplary embodiments of the present invention are also directed to a curtain airbag module used within a vehicle for providing coverage to the head and shoulder, torso and/or pelvis area of an occupant during side impact or rollover events. Exemplary embodiments of the present invention are also directed to a method of deploying the curtain airbag such that the secondary cushion chamber substantially inflates or reaches its full deployment position before the primary cushion chamber substantially inflates or reaches its full deployment position. As used herein deployment position is referred to as the desired primary or secondary cushion deployment configuration with respect to occupant loading. Furthermore and as used herein, the primary cushion chamber and the secondary cushion chambers may reach their respective full deployment position before or at the point of full inflation of the primary cushion chamber and the secondary cushion chamber. In addition, and as used herein full inflation of the primary cushion chamber and the secondary cushion chamber is intended to refer to a desired internal pressure being achieved in the primary cushion chamber and the secondary cushion chamber that is suitable for occupant interaction or loading (e.g., contact with the occupant).

In one exemplary embodiment, an inflatable curtain airbag for use in a vehicle is provided. The curtain airbag generally includes a primary cushion having a plurality of cells inflatable to a first position for providing protective coverage to a head portion of a seated occupant in a vehicle and a secondary cushion chamber having a shoulder lobe cell feature inflatable to a second position for providing protective coverage to a shoulder or shoulder area of the seated occupant, the shoulder lobe cell feature and the plurality of cells each being inflated with a proportion of inflation gas supplied by a single inflator when a threshold event occurs.

In another exemplary embodiment, a curtain airbag module for a vehicle having along a plurality of pillars (e.g., an A-pillar, a B-pillar, a C-pillar, etc.) of a side of a vehicle is provided. The airbag module in one exemplary embodiment generally comprises a curtain airbag including a primary cushion having a plurality of cells being inflatable to a first position for providing protective coverage to a head portion of a seated occupant in the vehicle and a secondary cushion chamber having a shoulder lobe cell feature inflatable to a second position for providing protective coverage to a shoulder or shoulder area, torso and/or pelvis of the seated occupant; an inflator for inflating the plurality of cells and the shoulder lobe cell feature, the inflator being in fluid communication with a gas diffusion means such as a diffuser tube located proximate to a top portion of at least the plurality of cells of the curtain airbag, the diffuser tube including a plurality of openings proximate each of the plurality of cells and the shoulder lobe cell feature for providing a plurality of fluid pathways for receiving the inflation gas therethrough and permitting the plurality of cells and the shoulder lobe feature to be inflated with inflation gas from the inflator when a predetermined event exceeds a deployment threshold.

In another exemplary embodiment, a method of deploying a curtain airbag module is provided. The method generally comprises the steps of: detecting a predetermined event by a sensor; sending a signal of the predetermined event to an electronic control unit, the electronic control unit determines if the predetermined event exceeds a deployment threshold; and activating an inflator to supply inflation gas to a curtain airbag when the predetermined event exceeds the deployment threshold, the curtain airbag includes a primary cushion having a plurality of cells being inflatable to a first position for providing protective coverage to at least a head portion of a seated occupant in the vehicle and a secondary cushion chamber having at least a shoulder lobe cell feature inflatable to a second position for providing protective coverage to a shoulder or shoulder area, torso and/or pelvis of the seated occupant, the shoulder lobe cell feature is fully deployed to the second position prior to the primary cushion chamber being fully deployed to the first position when the predetermined event exceeds the deployment threshold. As used herein the first position of the primary cushion chamber relates to a fully deployed position and the second position of the secondary cushion chamber related to a fully deployed position of the secondary cushion chamber.

Reference now will be made to the embodiments of the invention, one or more examples of which are set forth below. Each example is provided by way of explanation of the invention, not as a limitation of the invention. Exemplary embodiments of the present invention provide a single airbag or multiple airbags originating from the roof rail of a vehicle and being supplied pressurized gas or other inflation force from a single inflator providing a source of inflation for the primary cushion chamber and the secondary cushion chamber. Exemplary embodiments of the present invention provide at least two primary approaches to achieve the shoulder loading in addition to the head protection during side impact or rollover events. One means is through the use of an inflated airbag cell, chamber or feature (e.g., secondary cushion chamber) contiguous to or integral with a main airbag or primary cushion chamber. One alternative is to provide a separate inflated airbag cell, feature or chamber (e.g., secondary cushion chamber) that is in fluid communication with the gas delivery device (e.g. the single inflator), but otherwise designed as a separate appendage to the main inflatable cushion or primary cushion chamber. This appendage may be folded with the primary cushion chamber or separately. The appendage may also be restrained to the primary cushion chamber or inflatable curtain through the use of a strapping means as will further be discussed in more detail below.

Another means is through the use of an inflated airbag cell, chamber or feature (e.g., secondary cushion chamber) non-contiguous or separate from the main airbag or primary cushion chamber. In this embodiment, the secondary cushion chamber is deployed from a separate location in the vehicle as the primary cushion chamber; however, a single inflator is still used to deploy the primary cushion chamber and the secondary cushion chamber since they are both in fluid communication with the single inflator by a diffuser means. Moreover, the secondary cushion chamber will reach its fully deployed configuration prior to the primary cushion chamber reaching it fully deployed configuration and the location and the configuration of the secondary cushion chamber will cause the same to be insensitive a seat belt and seat belt retractor typically located in the area of deployment of side curtain airbags.

Turning now to the Figures exemplary embodiments of the present invention are illustrated. FIG. 1 illustrates a side impact or rollover curtain airbag module 10 having an inflatable curtain airbag or inflatable cushion 12 for providing protective coverage to the head and shoulder, shoulder area, and torso of an occupant during side impact or rollover events. The curtain airbag module 10 is used within a portion of a passenger compartment of a vehicle 14 in accordance with an exemplary embodiment of the present invention. The vehicle 14 includes a roof 16, a forward portion 18, and a rearward portion 20. Situated between the forward portion 18 and rearward portion 20 are a plurality of pillars such as a forward or A-pillar 30, a middle or B-pillar 32, and a rear or C-pillar 34 as shown. The curtain airbag or inflatable cushion 12 and/or the curtain airbag module 10 can be placed between the A-pillar 30 and B-pillar 32 or across from the A-pillar to the C-pillar depending on the application and/or amount of desired inflatable coverage. Furthermore, exemplary embodiments of the present invention are also intended to be used with other vehicle types including larger vehicles (e.g., sports utility vehicles) having an A-pillar, B-pillar, C-pillar and D-pillar, wherein the inflatable cushion extends from the A-pillar to the D-pillar.

The vehicle includes a roof rail 35, on either side, in the general vicinity of the side of the vehicle and the roof 16. The roof rail 35 is the general vicinity in which the curtain airbag or inflatable cushion 12 can be secured thereto. In one exemplary embodiment, a top portion or upper edge portion 36 of the curtain airbag or inflatable cushion 12 includes a plurality of openings in which a plurality of corresponding fasteners (not shown) are used to secure the upper edge portion 36 of the inflatable cushion 12 to the roof rail 35 via the openings. The folded inflatable cushion 12 can also be secured to the roof rail 35 using a plurality of retainer clips in addition to the fasteners, wherein each retainer clip includes pre-stressed tear regions to permit each clip to open upon inflation of the inflatable cushion 12. Of course other additional means of securing the inflatable cushion 12 to the vehicle could be used in accordance with one exemplary embodiment, such as using tethers on each end of the inflatable cushion 12 and attaching the same to the pillars of the vehicle using any suitable fastening means. Although only the left side of the vehicle is illustrated and discussed, the components discussed are also applicable to the right side of the vehicle.

Figure 2:
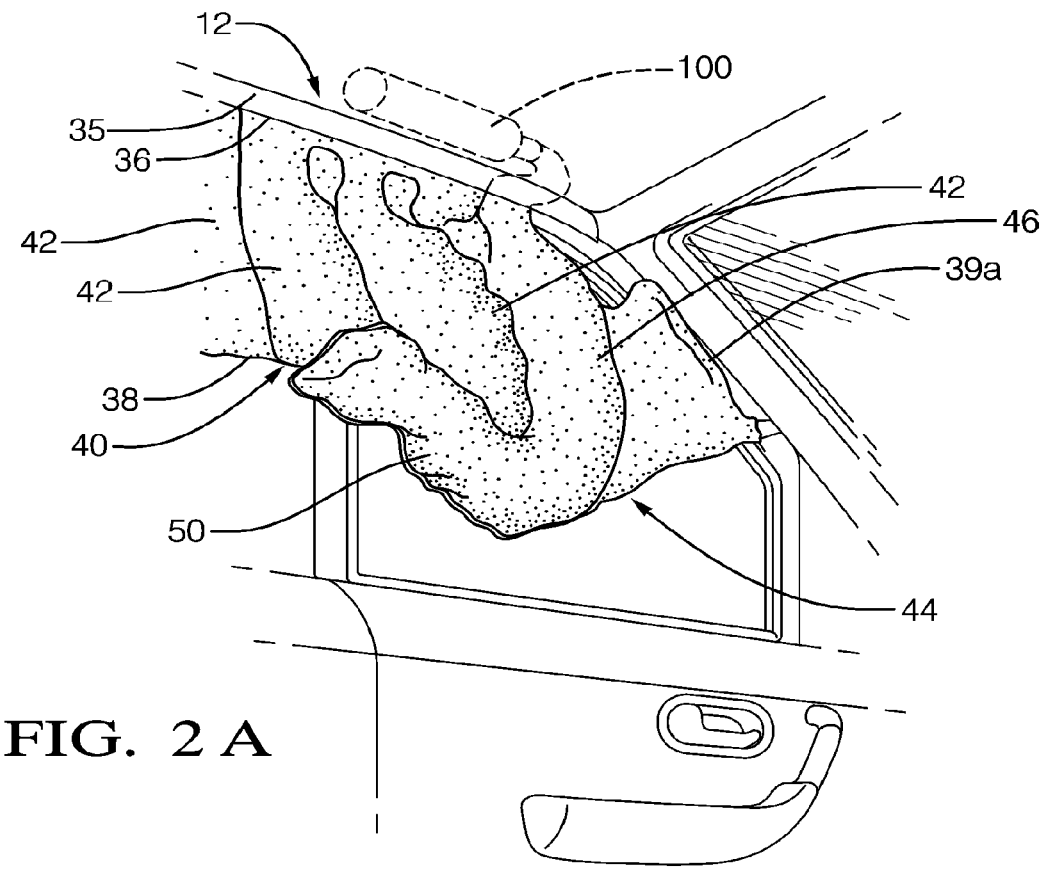
FIGS. 2A-2B illustrate deployment of a portion of an inflatable curtain airbag in accordance with an exemplary embodiment of the present invention.
Figure 2:
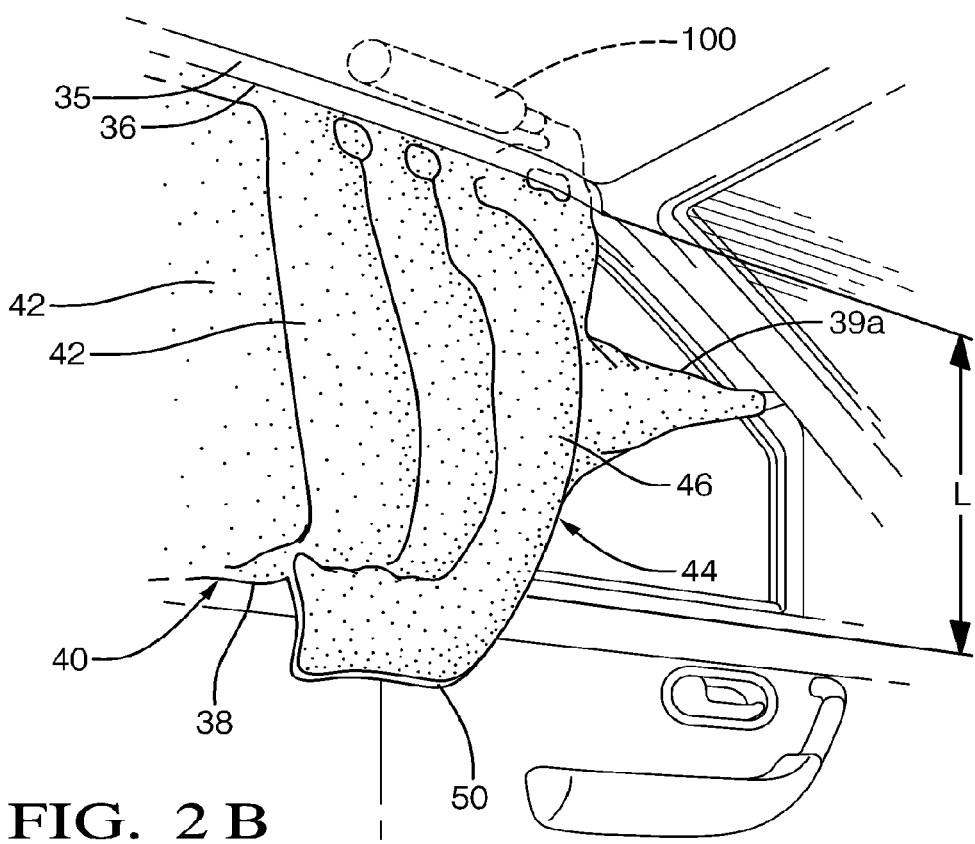

Referring now to the FIGS. 2A and 2B an exemplary embodiment of the present invention is illustrated.

Illustrated in FIG. 2A (mid-inflation or mid deployment) and FIG. 2B (full-inflation or fully deployed) is a contiguous or integral design of the inflatable cushion 12 in accordance with one exemplary embodiment of the present invention. Here the inflatable cushion has a top edge portion 36, a lower edge portion 38, a front-end portion 39a and a rear-end portion (not shown) and generally includes a primary cushion chamber 40 (only partially shown it being understood that the primary cushion chamber extends further towards the rear of the vehicle since only a portion of the vehicle is shown in FIGS. 2A and 2B) having a plurality of inflatable cells or features 42. The inflatable cushion 12 also includes a secondary cushion chamber 44 having an inflatable shoulder lobe feature distinct from the plurality of cells 42 of the primary cushion chamber 40. In one exemplary embodiment, the shoulder lobe feature or secondary cushion chamber 44 is contiguous or integral to the primary cushion chamber 40. In other words, the shoulder lobe feature or secondary cushion chamber 44 is integrally formed with the primary cushion chamber and the secondary cushion chamber 44 inflates mutually or mutually interacts with the primary cushion chamber 40, however, the secondary cushion chamber will reach its fully deployed configuration (FIG. 2B) before the primary cushion chamber reaches its fully deployed configuration. In one exemplary embodiment, the primary cushion chamber 40 and the secondary cushion chamber 44 each deploy from the roof rail 35 of the vehicle 14 to a deployment length L of the airbag or inflatable cushion 12. Each of the cells 42 and the shoulder lobe feature or secondary cushion chamber 44 can each be made of woven or sewn airbag fabric, such as a nylon fabric bag, or thermoplastic material that are welded or bonded together to enclose the airbag.

In one exemplary embodiment, each of the cells 42 and shoulder lobe feature or secondary cushion chamber 44 are sewn together or bonded, such as by using radio frequency waves, using one piece of fabric. However, other embodiments of the invention may employ more than one cut pieces of fabric, which are joined together in forming inflatable cushion 12. In one non-limiting exemplary embodiment, the primary cushion chamber is manufactured using the teachings of U.S. patent application Ser. No. 11/190,499 the contents of which are incorporated herein by reference thereto.

In one exemplary embodiment, the cells or features 42 of the primary cushion chamber 40 each elongate primarily in a top-down deployment direction or vertical direction to provide protection to the head area of the occupant when deployed or inflated during side impact or rollover events. The cells generally have an elongated shape when deployed. Of course, other shapes are contemplated, such as, rectangle, square, oval, or other appropriate protecting shapes. In one exemplary embodiment, a first section of the shoulder Lobe feature or secondary cushion chamber 44 elongates primarily in a top-down deployment direction and a second section of the secondary cushion chamber is configured to provide protection to the shoulder, shoulder area, torso and/or pelvis area of the occupant. In one exemplary embodiment the shoulder lobe feature or secondary cushion chamber 44 has a first section 46 configured as a shaft portion and a second section or portion 50 that extends from the first section. In one exemplary embodiment, the first section 46 extends in a vertical direction when fully deployed while the second section 50 extends in a distinct fore-aft deployment direction or plane, thereby providing the necessary extended coverage over the shoulder, shoulder area or torso of the occupant. In one non-limiting exemplary embodiment, secondary cushion chamber 44 generally has an L-shaped or a backward L-shaped configuration.

The deployment length L of the inflatable cushion 12 is of sufficient height such that when deployed (as illustrated in FIG. 2b) the inflatable cushion 12 will lie between the interior of the vehicle to at least the shoulder, shoulder area, torso and/or pelvis area of the occupant. The deployment length L or height of the inflatable cushion 12 can be of any size or height depending on the vehicle type or desired coverage. In accordance with an exemplary embodiment of the present invention second section 50 deploys below or partially below the lower edge portion 38 of the primary cushion chamber 40.

In this embodiment, the inflatable cushion 12 deploys or inflates in front of and covers portions of the B pillar as well as portions of the vehicle's windows and windowsills, thereby properly protecting the head and shoulder area of the occupant during side impact or rollover events. It is contemplated in other exemplary embodiments of the present invention that the inflatable cushion 12 extends coverage to the A-pillar as well as the C-pillar of the vehicle and in other embodiments A-D pillar coverage.

Figure 3:
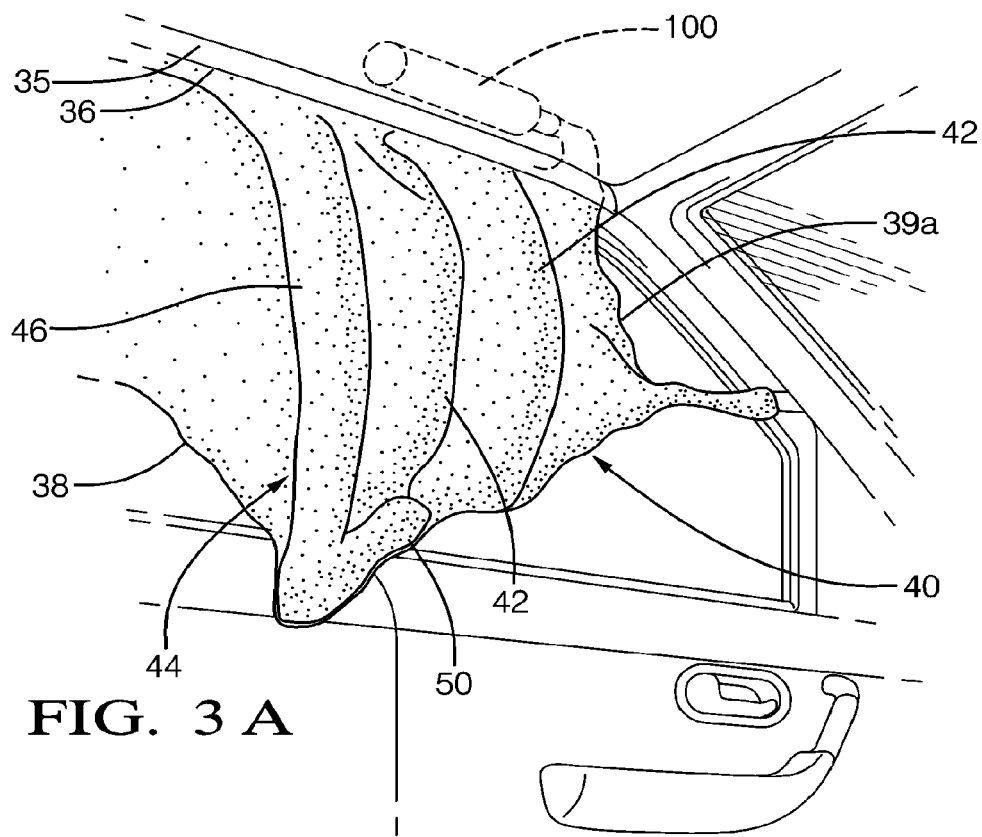
FIGS. 3A-3B illustrate deployment of a portion of an inflatable curtain airbag in accordance with an alternative exemplary embodiment of the present invention.
Figure 3:
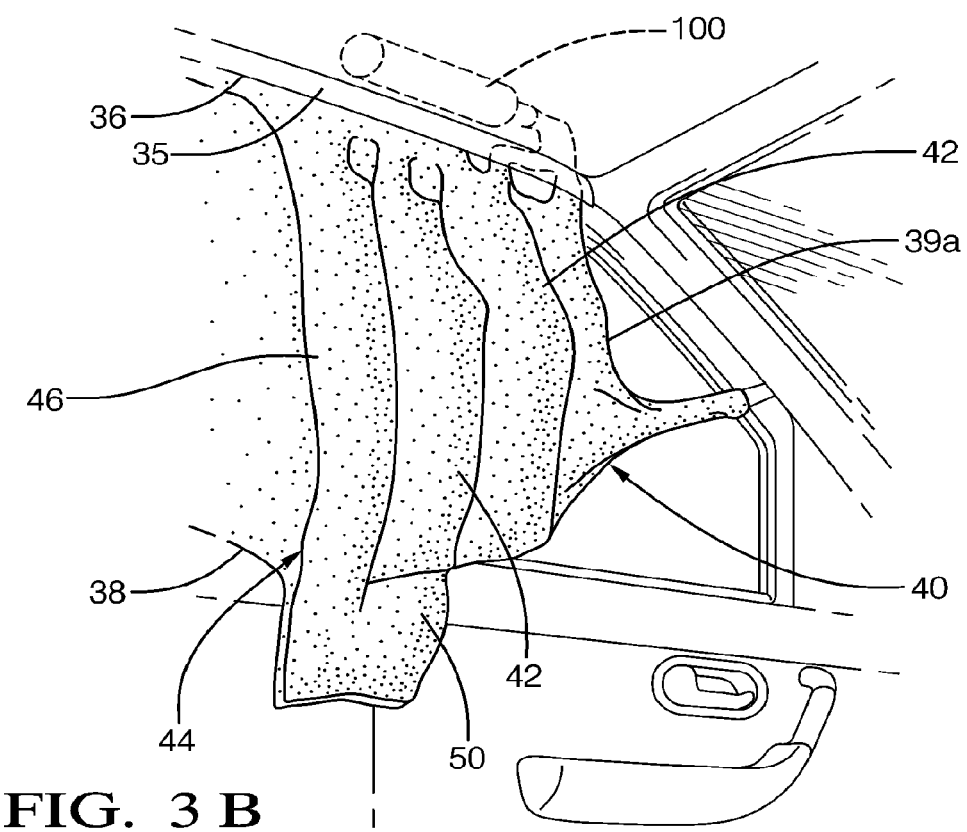

In one exemplary embodiment and referring to FIGS. 2A and 2B, the secondary cushion chamber is contiguous or integral to the primary cushion chamber and extends to protect the shoulder, shoulder area or torso of an occupant from the forward portion 18 of the vehicle 14, near the A-pillar 30 as shown in FIG. 2B. As shown in FIG. 2B, shoulder lobe feature or secondary cushion chamber 44 generally has a backward L-shaped configuration. Alternatively, the shoulder lobe feature or secondary cushion chamber 44 extends from the B-pillar 32 to protect the shoulder, shoulder area or torso of the occupant as shown in FIGS. 3A (mid-inflation) and 3B (full-inflation). Again, only a portion of the primary cushion chamber is illustrated in FIGS. 3A and 3B since only a portion of the vehicle is illustrated. It is understood that the primary cushion chamber will extend along the side of the vehicle in order to provide the desired protective coverage. In one embodiment, the primary cushion chamber will extend at least as long as the un-inflated cushion illustrated in FIG. 1. Having the shoulder lobe feature or secondary cushion chamber 44 extend near the A-pillar 30 (FIG. 2B) may provide for better insensitivity to seat belt interaction (since seat belts typically extend from the B-pillar) than when the shoulder lobe feature or secondary cushion chamber 44 extends near the vicinity of the B-pillar 32 (FIG. 3B). Of course, seat belt retractor locations may vary from vehicle design to vehicle design. In either configuration, the occupant will be protected in both the head and shoulder or shoulder area.

Figure 4:
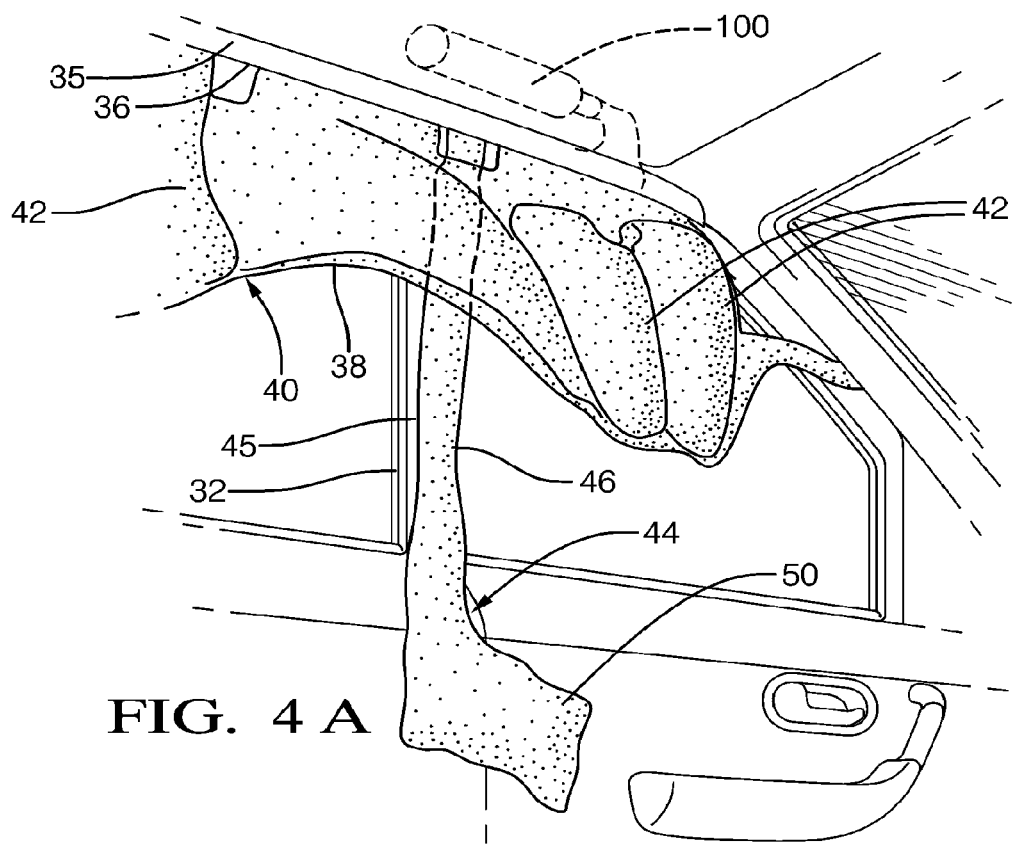
FIGS. 4A-4B illustrate deployment of a portion of an inflatable curtain airbag in accordance with still another alternative exemplary embodiment of the present invention.
Figure 4:
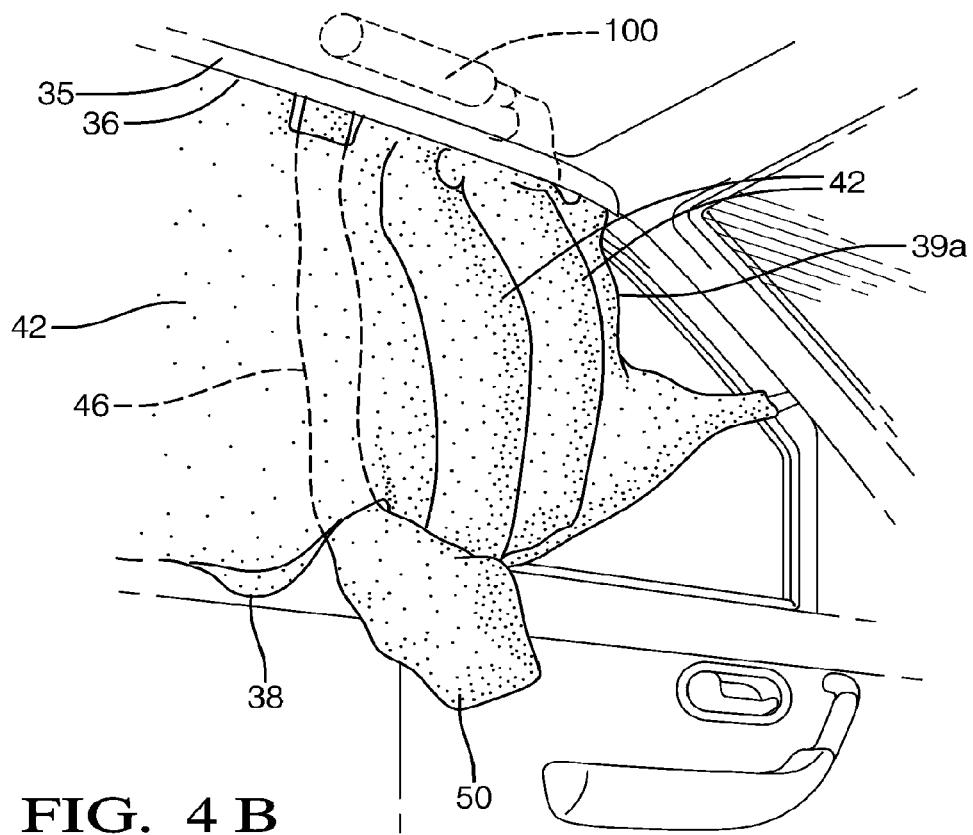

Referring now to FIGS. 4A (mid-inflation or mid deployment) and 4B (full inflation or full deployment) exemplary embodiments of a non-contiguous design of the inflatable cushion are illustrated. In one exemplary embodiment, the shoulder lobe feature or secondary cushion chamber 44 is a separate appendage from the primary cushion chamber 40. In other words, the secondary cushion chamber 44 inflates independently from primary cushion chamber 40 or does not mutually interact with primary cushion chamber 40. However, both the primary cushion chamber and the secondary cushion chamber are each inflated by a single inflator wherein the inflation gases are routed to both the primary cushion chamber and the secondary cushion chamber via a diffuser tube or tubes and the secondary cushion chamber is separate from the primary cushion chamber. In one non-limiting exemplary embodiment, shoulder lobe feature or secondary cushion chamber 44 is packaged and routed beneath a B-pillar trim 45 of the B-pillar 32, thus having a portion (e.g., first section) of the shoulder lobe feature or secondary cushion chamber 44 being positioned between the primary cushion chamber and the vehicle frame and another portion (e.g., second section) positioned below the primary cushion chamber as illustrated in FIGS. 4A and 4B. Of course, and as applications and configurations may require, a portion of the first section may be below the primary cushion chamber or a portion of the second section may be between the primary cushion chamber and the vehicle. In this embodiment, the primary cushion chamber 40 is folded and packaged in and/or along the roof rail 35 behind vehicle trim, while the secondary cushion chamber 44 is partly folded and packaged in and/or along the B-pillar 32 behind the vehicle trim, each of which are designed to allow the primary and secondary cushion chambers to deploy therefrom. More specifically, the first section 46 of the shoulder lobe feature or secondary cushion chamber 44 is folded and routed beneath the upper B-pillar trim of the B-pillar 32, while the second portion 50 is folded into the lower B-pillar trim of the B-pillar 32. As such and via second portion 50, the shoulder lobe feature or secondary cushion chamber 44 has an appreciable deployment trajectory in the fore-aft plane of the vehicle. The first section 46 of shoulder lobe feature 44 is packaged in an unfolded manner prior to inflation, thus does not need to elongate in a top-down deployment direction. Thus, when pressurized gas is supplied to the shoulder lobe feature or secondary cushion chamber 44, the unfolded first section 46 is simply expanded by the pressurized gas, while the second section 50 moves to an unfolded state and deploys primarily in a fore-aft plane from the B-pillar. This embodiment is particularly useful for providing occupant protection in the event a seat belt retractor or mounting bracket or seat belt adjuster or "D ring" 47 (illustrated schematically in FIG. 1) for a seat belt is located on an upper portion of the B-pillar since the seat belt and/or retractor or "D-ring" may be in the way of a deploying side curtain airbag. However, and in accordance with an exemplary embodiment of the present invention the secondary cushion chamber deploys from the behind the trim of the B-pillar without being caught on the seat belt or seat belt retractor since the secondary cushion chamber deploys mostly (e.g., second section) below the location of the seat belt retractor on the B-pillar.

Figure 5:
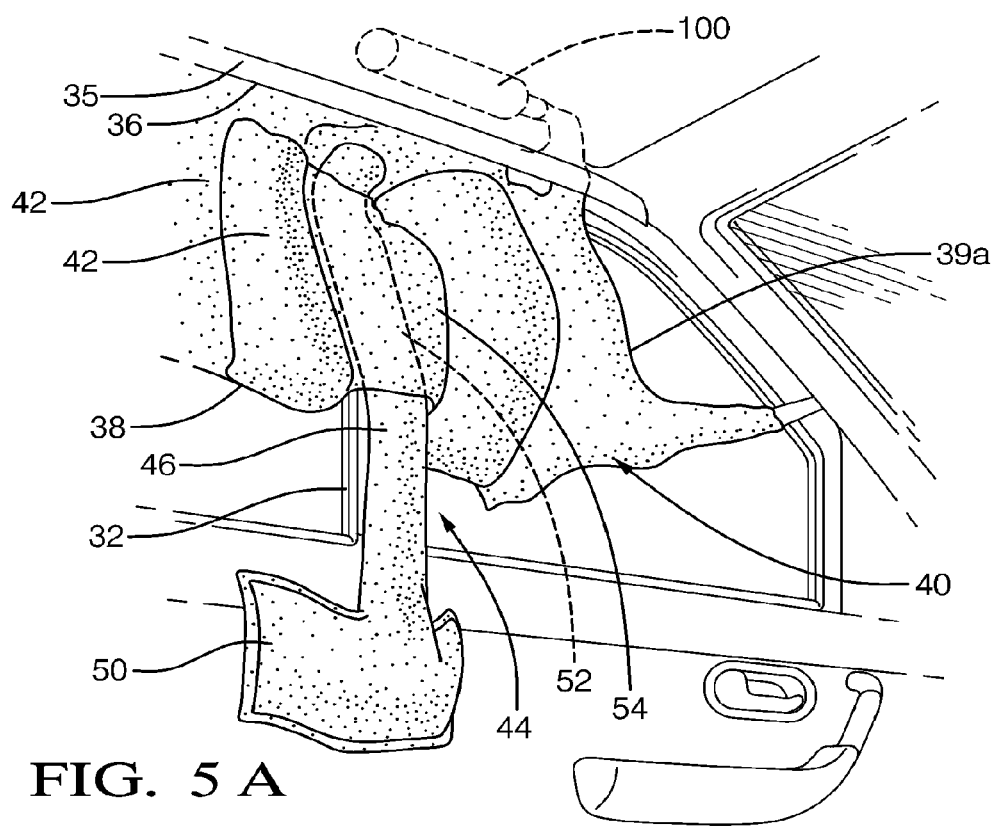
FIGS. 5A-5B illustrate deployment of a portion of an inflatable curtain airbag in accordance with yet another alternative exemplary embodiment of the present invention.
Figure 5:
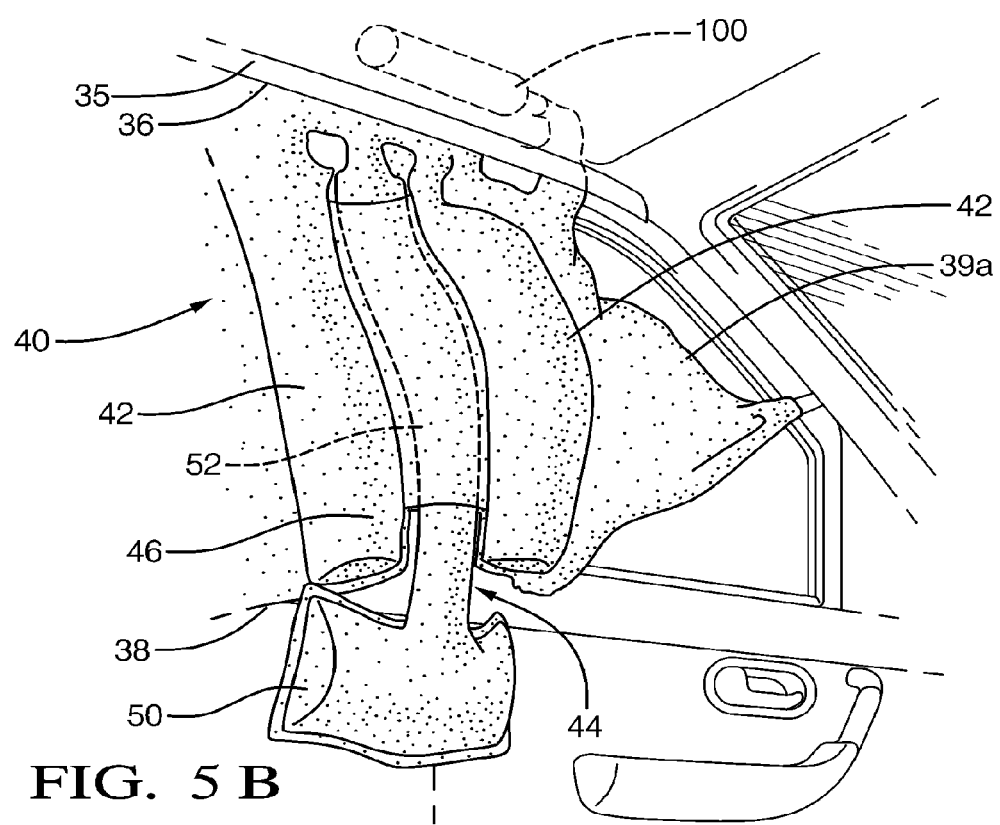

Referring now to FIGS. 5A (mid-inflation or mid deployment) and 5B (full-inflation or full deployment) of another alternative exemplary embodiment of the present invention is illustrated. Here another non-contiguous design of inflatable cushion 12 in accordance with an exemplary embodiment of the present invention is illustrated, wherein the secondary cushion chamber is separate from the primary cushion chamber. In an alternative exemplary embodiment only a top portion is integral with the primary cushion chamber to allow fluid communication therebetween. Again, only a forward portion of the primary cushion chamber is illustrated. In one exemplary embodiment, shoulder lobe feature or secondary cushion chamber 44 is packaged in along the roof rail 36 with primary cushion chamber 40 as shown. The shoulder lobe feature or secondary cushion chamber 44 can be folded and packaged with, through, or adjacent any of the plurality of cells 42 of primary cushion chamber 40. In one exemplary embodiment, shoulder lobe feature or secondary cushion chamber 44 is folded with the primary cushion chamber 40 and is a separate appendage routed beneath a sheath 52 formed by the same or different airbag fabric of the primary cushion chamber 40. The sheath 52 is secured to another un-inflated portion of the primary cushion chamber and acts as a sleeve defining a tube for a portion of the secondary cushion chamber to pass therethrough. The sheath and tube acts as a means for securing the shoulder lobe feature or secondary cushion chamber 44 to the primary cushion chamber 40 of inflatable cushion 12, thus making certain that shoulder lobe feature or secondary cushion chamber 44 is secured to a position for protecting the shoulder, shoulder area or torso of the occupant as desired. In other words, the sheath 52 will prevent the shoulder lobe feature or secondary cushion chamber 44 from swinging around the interior of the vehicle during side impact or rollover events. As shown in FIG. 5B, the shoulder lobe feature or secondary cushion chamber 44 in this embodiment has a deployment trajectory that is primarily top-down (first section 46), but includes a distinct fore-aft fold and deployment characteristic as well (second section 50). In other words, section 50 may extend in both the foreword and rearward (aft) directions from the first section.

Figure 6A:
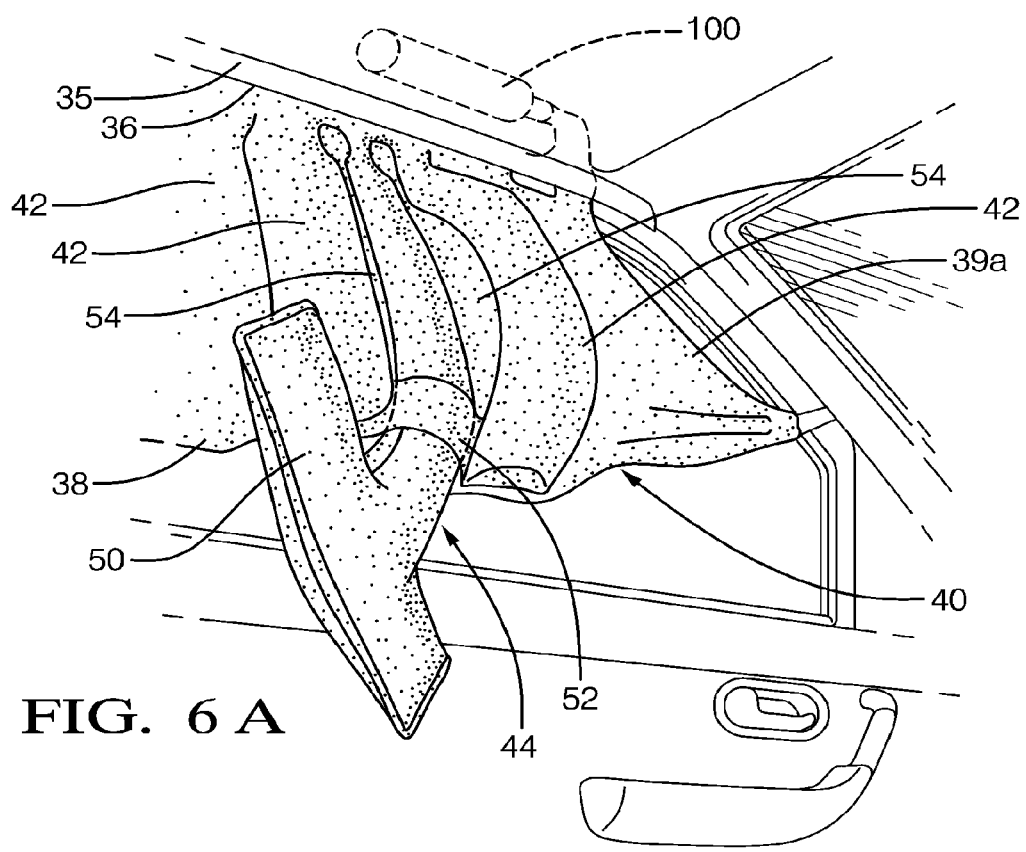
FIGS. 6A-6B illustrate deployment of a portion of an inflatable curtain airbag in accordance with yet another alternative exemplary embodiment of the present invention.
Figure 6B:
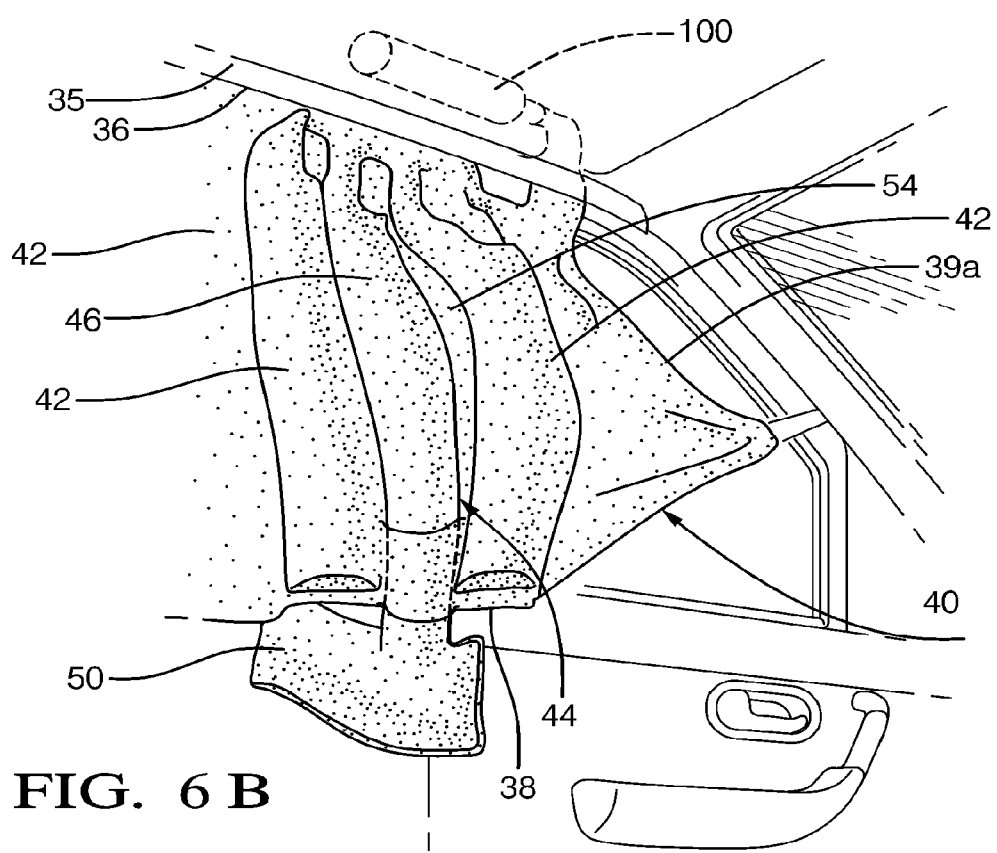

The sheath 52 can be of any size or shape. The sheath 52 can secure any portion of shoulder lobe feature or secondary cushion chamber 44 to the primary cushion chamber 40. In one embodiment, the sheath is disposed over a non-inflated region 54 of the primary cushion chamber. In one exemplary embodiment, sheath 52 substantially extends from the top end to near the bottom end of the first section 46 of shoulder lobe feature or secondary cushion chamber 44 as shown in FIG. 5B. In this embodiment, as the primary cushion chamber 40 deploys, the sheath 52 of the primary cushion chamber moves down along the length of the first section 46 of shoulder lobe feature or secondary cushion chamber 44 covering regions of the first section 46 as the primary cushion chamber moves towards full deployments (FIG. 5B). In an alternative exemplary embodiment, sheath 52 extends from near the middle section of the first section 46 to the bottom end of first section 46 of shoulder lobe feature or secondary cushion chamber 44 as shown in FIGS. 6B (mid-inflation or mid deployment) and 6B (full-inflation or full deployment). In this alternative embodiment, as the primary cushion chamber 40 deploys in the vertical direction, the sheath 52 of the primary cushion chamber slides down along the length of the shaft portion of shoulder lobe feature or secondary cushion chamber 44 until the primary cushion chamber 40 reaches full deployment (FIG. 6B) covering only the lower end of the first section 46 of the shoulder lobe feature or secondary cushion chamber 44. Here the sheath slides along the secondary cushion chamber since the same fully deploys before the primary cushion chamber.

It should be understood that sheath 52 can be located anywhere along the first section 46 of airbag feature or first section 46 for securing the same to the primary cushion chamber 40. It should further be understood that shoulder lobe feature or secondary cushion chamber 44 can be positioned anywhere along the length of the inflatable cushion 12 and between any of the plurality of chambers 42 and should not be limited to positions shown in the Figures.

Referring back to FIG. 1 airbag module 10 includes the inflatable cushion 12 described in any of the FIGS. 2A-6B (shown in a folded state). The airbag module also includes a single inflator 100 for providing an inflation gas to the primary inflation chamber and secondary inflation chamber via a diffuser tube 102. In one exemplary embodiment, the rear end portion 38b of the inflatable cushion 12 includes an opening for receiving the diffuser tube and/or a portion of the inflator. In one exemplary embodiment, the inflator 100 includes a mounting bracket to permit the inflator 100 to be mounted to an adjacent structural component of the vehicle. Of course, the inflator may be located in numerous locations of the vehicle with respect to the inflatable cushion; for example, the inflator may be located at the forward end of the vehicle or in close proximity to the secondary cushion chamber and the front end portion 39a wherein non-limiting locations are illustrated in FIG. 1 and the inflator locations illustrated in FIGS. 2A-6B, 13 and 14.

In one exemplary embodiment, the inflator 100 is a solid propellant, hybrid, augmented, compressed gas, stored gas, cold gas or liquid inflator of any known variety, which upon activation (e.g., sensed side impact or rollover event) produces or supplies pressurized inflation gas to the inflatable cushion 12. The inflator 100 can be of the type that uses a faster gas, such as helium or mixtures of gases including helium, in order to fully deploy the inflatable cushion 12 within a desired time after the sensed event. In one exemplary embodiment, the inflator 100 includes an axially oriented output port, which is in fluid communication with an opening of inflatable cushion 12.

In one exemplary embodiment, the diffuser tube 102 is located within the top portion or upper edge portion 36 of the folded inflatable cushion 12 and extends substantially the length of the inflatable cushion 12. In one non-limiting embodiment, the diffuser tube 102 is made of an elastomeric material having a reinforced material made of a braided or woven fabric. Alternatively, diffuser tube 102 can be made of metal, plastic, rubber or nylon. The diffuser tube 102 includes a plurality of openings located thereacross that are correspondingly in fluid communication with openings (not shown) on the curtain bag 12 for providing fluid pathways to each of the plurality of chambers 42 and shoulder lobe feature or secondary cushion chamber 44 for receiving gas from the inflator 100 thereto. The diffuser tube and the primary cushion chamber may be manufactured in accordance with the teachings of U.S. patent application Ser. No. 11/190,499.

In one exemplary embodiment, one of the plurality of openings of the diffuser tube is dedicated to expressly deliver a proportion of gas to the shoulder lobe feature or the secondary cushion chamber 44. The secondary cushion chamber 44 has a larger sized openings than the openings dedicated to expressly deliver gas to the plurality of chambers 42 of the primary cushion chamber 40. As such, in exemplary embodiments where the inflator 100 is positioned near the vicinity of the shoulder lobe feature or secondary cushion chamber 44, the pressurized gas from the inflator 100 flowing through the diffuser tube 102 will fully deploy shoulder lobe feature or secondary cushion chamber 44 prior to full deployment of the secondary cushion chamber 40. In other words, having a larger opening dedicated to the shoulder lobe feature or secondary cushion chamber 44 when the shoulder lobe feature is near the inflator 100 will force pressurized gas supplied by inflator 100 moving along diffuser tube 102 to be delivered to the shoulder lobe feature or secondary cushion chamber 44 more rapidly than to the plurality of chambers 42, thereby having shoulder lobe feature or secondary cushion chamber 44 fully deployed prior to the primary cushion chamber 40. Alternatively, the size and volumes of the primary cushion chamber and the secondary cushion chamber will dictate the deployment sequence of the same.

In instances where the inflator 100 is not near the immediate vicinity of the shoulder lobe feature or secondary cushion chamber 44, other methods of deploying the shoulder lobe feature or secondary cushion chamber 44 to full deployment prior to the plurality of chambers 42 of the primary cushion chamber 40 or increasing the forcing function to deliver gas to shoulder lobe feature or secondary cushion chamber 44 include having the diffuser tube 102 to be configured to provide two separate fluid channels, where one channel is dedicated to shoulder lobe feature or secondary cushion chamber 44 of the secondary cushion chamber while the other channel is dedicated to the plurality of cells 42 of primary cushion chamber 44. In this configuration, the diffuser tube 102 having the split channels is still in fluid communication with single inflator 100; however, the split channels will allow the secondary cushion chamber 44 to inflate/deploy prior to the primary cushion chamber 40. As such, inflator 100 is still the single source of pressurized gas for both the primary cushion chamber 40 and the secondary cushion chamber 44. Of course, this is yet another way to deliver gas to the shoulder lobe feature or secondary cushion chamber 44 prior to the plurality of cells 42 of the primary cushion chamber 40 and exemplary embodiments of the present invention contemplate alternative methods for delivering gas to shoulder lobe feature or secondary cushion chamber 44 prior to the primary cushion chamber 40 or increasing the forcing function to deliver gas to the shoulder lobe feature or secondary cushion chamber 44.

In one non-limiting exemplary embodiment, shoulder lobe feature or secondary cushion chamber 44 in either the contiguous design (e.g., separate) or non-contiguous design of the inflatable cushion is inflated by the single inflator 100 to a functional thickness for occupant interaction before approximately 18 milliseconds (ms) after the sensing of a side impact, rollover event or other activation event. In one non-limiting exemplary embodiment, the shoulder lobe feature or secondary cushion chamber 44 deploys into the second position or fully deployed position prior to the deployment of the primary cushion chamber 40 to the first position or its fully deployed position by at least 1 ms. Of course, and as applications may require, the primary cushion chamber and the secondary cushion chamber may reach their respective fully deployed positions at times greater or less than those mentioned herein.

In accordance to one exemplary embodiment and illustrated schematically in FIG. 1, the side impact or rollover events are detected by a sensor 130 or a plurality of sensors 130 in signal communication with an electronic control unit 132. It should be appreciated that the sensor 130 can be any suitable sensor for detecting side impact or rollover events, such as an acceleration sensor. It should further be appreciated that the electronic control unit 132 can be of any known variety for providing a command to the inflator 100 to begin operation or supplying pressurized gas to the inflatable cushion 12 once the electronic control unit 132 determines that the sensed side impact or rollover event exceeds a deployment threshold. For example, the control unit may comprise a controller comprising a microcontroller, microprocessor, or other equivalent processing device capable of executing commands of computer readable data or program for executing a control algorithm. In order to perform the prescribed functions and desired processing, as well as the computations therefore (e.g., operating the motor and pump), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces. Control unit 132 and sensor 130 are shown schematically and their location may be anywhere in the vehicle to provide a suitable deployment of the airbag module.

Notably, the non-contiguous design of inflatable cushion 12 as described above having the separate appendage will have superior insensitivity to belt interaction. However, it should be appreciated that each of the contiguous and non-contiguous designs of the inflatable cushion 12 enable the secondary cushion chamber 44 of the airbag to inflate preferentially and early. Both designs also enable the secondary cushion chamber 44 of the airbag to inflate without anchored resistance to the primary cushion chamber 40, thus improving the ability of the shoulder lobe feature or secondary cushion chamber 44 to achieve preferentially reduced deployment time to position. Although the primary cushion chamber 40 may lag, this is not detrimental to system performance since head protection typically occurs later in a side-impact or rollover event.

An exemplary method of providing protective coverage to the head and shoulder, shoulder area, torso of the occupant during side impact or rollover events using the foregoing exemplary structures is described. The exemplary method generally includes detecting a side impact or rollover event by the sensor 130. Then, the sensor 130 sends a signal to the electronic control unit 132 to determine if a side impact or rollover event has occurred. If such an event(s) occurs, the electronic control unit 132 sends a command to the inflator 100 to begin operation. Pressurized gas accumulated in the inflator 100 is supplied to diffuser tube 102. Using either of the gas delivering methods (e.g. diffuser tube with split channels) described above, the pressurized gas from inflator 100 flows into both the shoulder lobe feature or secondary cushion chamber 44 and the plurality of cells 42 such that the shoulder lobe feature or secondary cushion chamber 44 is fully deployed prior to the full deployment of the primary cushion chamber. The shoulder lobe feature or secondary cushion chamber 44 and the plurality of cells 42 deploy according to the inflatable cushion design as described above and selected for a particular application. As a result, the occupant will have sufficient protective coverage in both the head and shoulder area or torso.

In one non-limiting exemplary embodiment, second cushion chamber 50 is configured to have a larger area such that the second cushion chamber is configured to provide coverage to a shoulder (e.g., shoulder, shoulder area or torso) and a pelvis of the occupant such that the second cushion chamber as provides a pelvic pusher for interaction between the pelvis of the occupant and the vehicle frame.

Figure 7A:
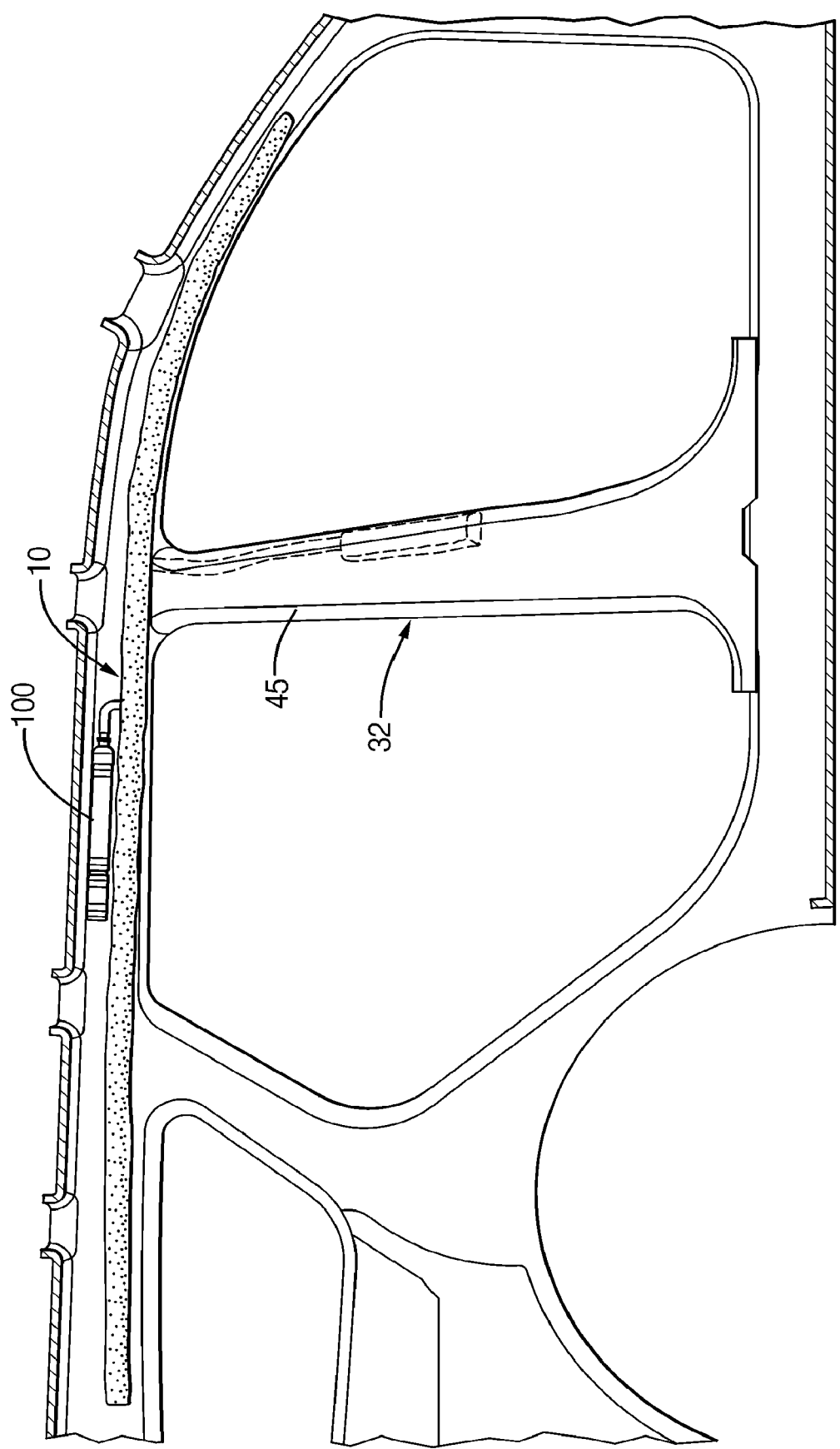

Referring now to FIGS. 7A-7C an exemplary embodiment of the present invention is illustrated. Here and as previous described with respect to FIGS. 4A and 4B, airbag module 10 is configured to have a non-contiguous or separate secondary cushion chamber 44 located on a B-pillar 32 wherein the un-inflated secondary cushion chamber is disposed behind a B-Pillar trim portion 45. In this embodiment, the secondary cushion chamber is completely separate from the primary cushion chamber; however, fluid communication between them and the single inflator is provided by a diffrser means such as diffuser tubes, manifolds, fabric tubes and equivalents thereof. FIG. 7A illustrates the airbag module mounted to the vehicle with the trim portion 45 in place while FIG. 7B illustrates the airbag module without the primary cushion chamber and the trim portion in place and FIG. 7C illustrates the airbag module without the primary cushion chamber and without the trim portion in place illustrating the non-deployed configuration of the secondary cushion chamber.

As illustrated, the secondary cushion chamber has an upper or first chamber 46 and a lower or second cushion chamber 50 each of which are in fluid communication with each other and are inflated by the single inflator 100 during an activation event. In accordance with an exemplary embodiment the first chamber 46 is stored in an unfolded and un-inflated state positioned to merely expand while the second cushion chamber 50 is stored in a folded state and unfolds and deploys outwardly and away from the B-pillar or equivalent structure it is mounted to. In this way second cushion chamber is configured to have more displacement during deployment than the first cushion chamber. Of course, and as applications may require the first chamber may also be folded depending on the amount of material required to form the tube from the diffuser means (e.g., diffuser tubes, manifolds, fabric tubes etc.) to the second cushion chamber 50.

As illustrated, the inflator is in fluid communication with a diffuser tube 102 that is configured to provide inflation fluid to the primary and secondary cushion chambers during a deployment event. In accordance with an exemplary embodiment of the present invention and referring now to FIG. 8, diffuser tube 102 has a "T" shaped configuration and is also in fluid communication with a secondary cushion chamber via an inflation tube 120, which is a vertical portion of the "T" shaped diffuser tube 102. In other words, the "T" shaped diffuser tube has a main tube section 118 for the primary cushion chamber and an auxiliary tube section 120 for the secondary cushion chamber. As used herein "T" shaped is merely provided to describe a diffuser tube with a main tube section and an auxiliary tube section and the sections of the diffuser tube may be curved and angled with respect to each other. In other words, it is understood that the diffuser tube does not require a specific "T" shaped configuration.

In accordance with an exemplary embodiment and as illustrated in FIG. 8 diffuser tube 102 has a pair of flow restriction areas 122 wherein the conduit path of the diffuser tube 118 is restricted to be smaller than the rest of the conduit path in order to direct gas from the inflator to the secondary cushion chamber first thus causing the secondary chamber to be inflated first wherein the inflation gases for inflating the primary cushion chamber and the secondary chamber are provided from a single inflator 100. As illustrated in FIG. 8, a main horizontal or generally horizontal tube 118 is in fluid communication with the inflator, the primary cushion chamber via a plurality of inflation openings and the secondary cushion chamber via tube 120. As shown, one neck down or flow restriction portion is just to the left of the connection of the inflator to the tube 118 while the other neck down or flow restriction portion is just to the right of the intersection of tube 120 and tube 118. For example, and in one non-limiting exemplary embodiment and if the conduit has a circular configuration the inner diameter of tube 118 is 11-12 mm and the inner diameter at the neck down portions 122 is 9 mm. Of course, other diameters greater and less than the aforementioned ranges are contemplated to be within the scope exemplary embodiments of the present invention. Moreover, differences in size between the neck down portions and the diffuser tube may be greater than the aforementioned respective ranges. Furthermore, the diffuser may comprise any shape comprising a conduit for the fluid paths and flow restriction is provided by selectively reducing portions of the same.

Accordingly, and when the inflator has been fired the inflation gases are directed into tube 120 thus, causing the secondary cushion chamber to inflate and fully deploy quicker than a time required to fully deploy the primary cushion chamber. This is illustrated by the arrows 126 in FIG. 8, wherein the neck down portions or restricted flow paths or reduced inner diameters 122 cause the inflation gases to be directed into tube 120 as there is now a neck down portion or conduit reduction at either side of the intersection between tube 118 and tube 120.

Referring now to FIG. 9 yet another alternative exemplary embodiment is illustrated, here a single diffuser tube 102 is employed and the upper or first section 46 of the secondary cushion chamber is configured to be secured to the diffuser tube 102 proximate to an opening 128 (e.g., scoop, penetration or hole) in the diffuser tube. Here the inflation gases will travel into the secondary cushion chamber via upper or first section 46 of the secondary cushion chamber 44 that is secured about diffuser tube 102 via a pair of clamping members 130. As in the previous embodiment and as illustrated in FIG. 8, neck down portions, flow path restrictions or inner diameter reductions can be utilized to direct the inflation gases into the secondary cushion chamber 44. Alternatively, and based upon the respective sizes or volumes of the primary cushion chamber and the secondary cushion chamber the reduced volume of the secondary cushion chamber may cause the same to be fully deployed before the primary cushion thus, the conduit restrictions may not be necessary.

Referring now to FIGS. 10A-10C yet another alternative exemplary embodiment is illustrated. Here tube portion 120 is configured to have a stop 132 formed at the end of tube portion 120 such that an end portion 134 of upper or first section 46 of the secondary cushion chamber 44 is secured thereto via a clamp 136 or other equivalent means that seals end portion 134 to the tube portion 120 while also providing slidable movement between the two during inflation of the secondary cushion chamber via tension forces being applied to the cushion by deformation of the vehicle.

For example, and as illustrated in FIG. 10B, the end portion 134 is positioned away from the stop 132. If during a vehicle collision or activation event, the B-pillar and other portions of the vehicle become deformed there may be tension applied to the inflated or inflating secondary cushion chamber (e.g., in the direction of arrow 138) thus end portion 134 slides or translates toward stop 132. Accordingly, this range of slidable movement allows fluid communication to be maintained between the inflator and the secondary cushion chamber without excessive tension forces being applied to the secondary cushion chamber. Moreover, this configuration also allows the secondary cushion chamber to have an extended area of coverage during vehicle deformation, through the slidable movement of the same. In order to allow for a slight translation between the end portion of the first or upper cushion of the secondary cushion chamber end portion 134 can slide towards stop 132. In one exemplary embodiment, the range of movement is approximately 100 millimeters. Of course, ranges greater or less than the aforementioned range are considered to be within the scope of exemplary embodiments of the present invention. Moreover, the embodiment illustrated in FIGS. 10A-10C can be used with the "T" tube illustrated in FIG. 8 or a "Y" tube manifold as will be discussed below.

Figure 11:
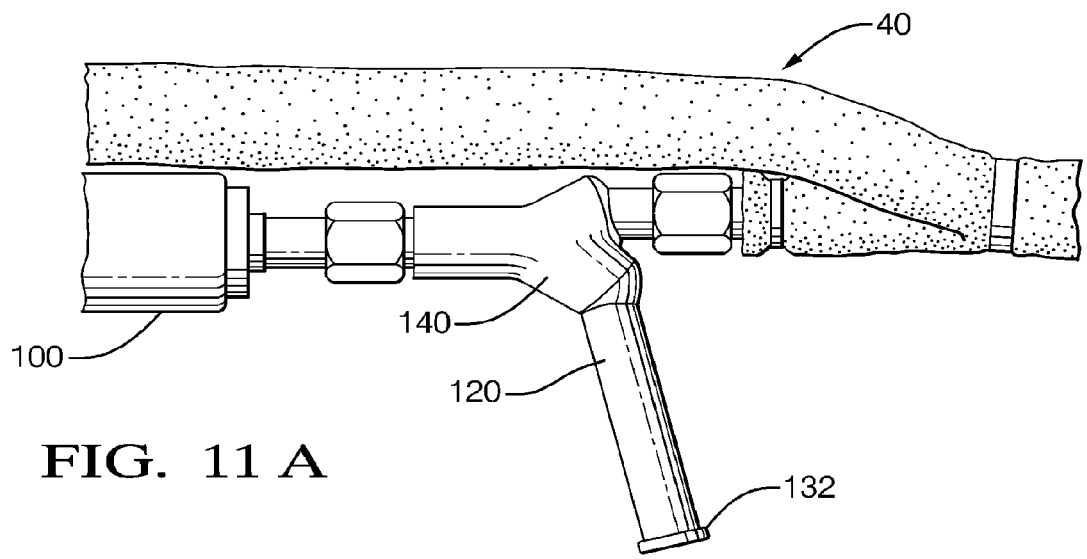
FIGS. 11A-11C illustrate still another alternative exemplary embodiment of the present invention.
Figure 11:
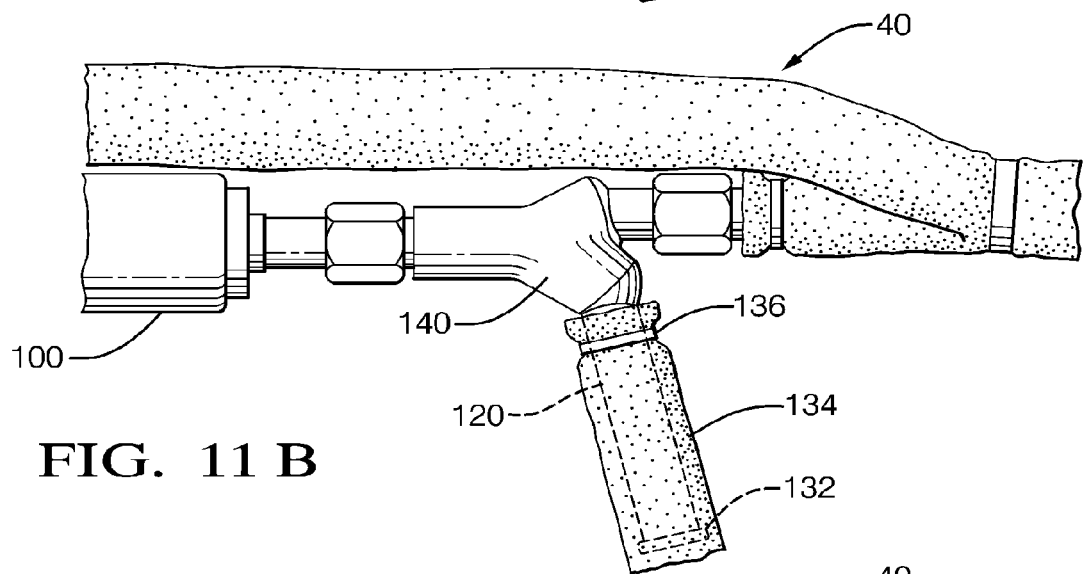
Figure 11:
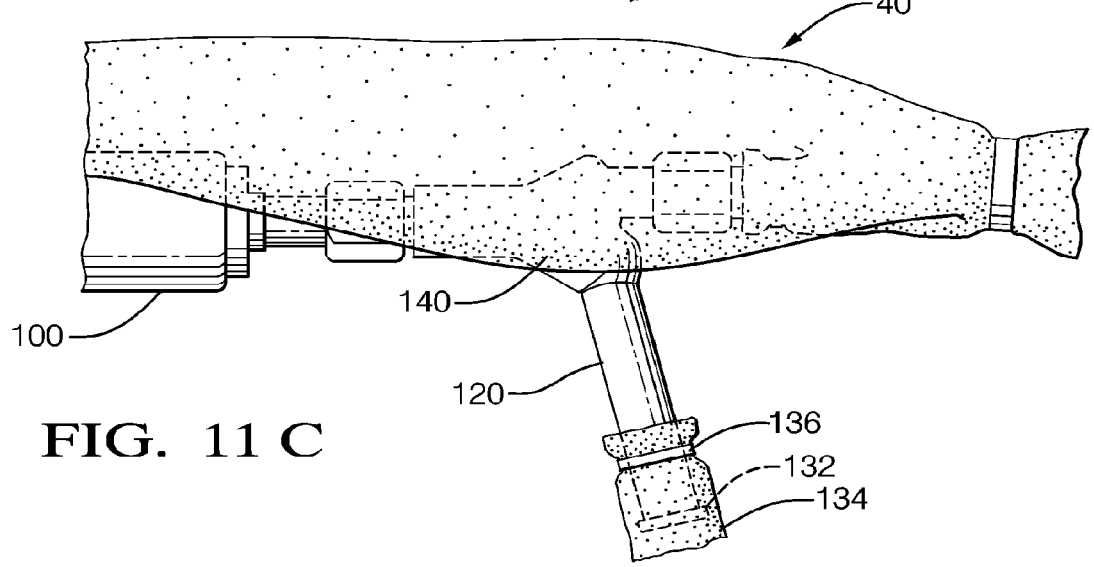

Referring now to FIGS. 11A-11C another alternative exemplary embodiment is illustrated. Here tube portion 120 with stop 132 formed is in fluid communication with a manifold or "Y" shaped manifold 140 configured to direct inflation gases from the inflator to the primary and secondary cushion chambers wherein the appropriate amount of fluid or inflation gases is directed to cause the secondary cushion chamber to fully deploy first. For example and depending on the internal volumes of the primary cushion chamber and the secondary cushion chamber being inflated, the portion of the "Y" tube feeding inflation gases to tube portion 120 may have a different diameter or flow path opening than the portion of the "Y"

tube feeding inflation gases to the primary cushion chamber via diffuser tube 102. Furthermore, and again depending on the internal volumes of the primary cushion chamber and the secondary cushion chamber being inflated, the portion of the "Y" tube manifold feeding inflation gases to tube portion 120 may have substantially the same flow path opening or diameter as the portion of the "Y" tube manifold feeding inflation gases to the primary cushion chamber via diffuser tube 102 since the secondary cushion chamber will have a substantially smaller volume than the primary cushion chamber. Of course, other configurations of the "Y" tube manifold are contemplated to provide suitable gas direction capabilities.

FIG. 11A shows the "Y" manifold and tube portion 120 without the secondary cushion chamber secured thereto while FIGS. 11B and 11C illustrate the translational movement of the end portion 134 on the tube portion 120. Again, this range of slidable movement allows fluid communication to be maintained between the inflator and the secondary cushion chamber without excessive tension forces being applied to the secondary cushion chamber. Moreover, this configuration also allows the secondary cushion chamber to have an extended coverage area during vehicle deformation and through the slidable movement of the same.

Referring generally to the embodiments of FIGS. 9-11C it is understood that the gas delivery mechanisms or gas diffusion means (e.g., diffuser tubes, manifolds, fabric tubes etc.) allow the secondary cushion chamber to fully deploy to its desired position first or before the primary cushion chamber reaches its fully deployed configuration. Also, the primary cushion chamber and the secondary cushion chamber are each preferably in fluid communication with each other via the diffuser tubes, manifolds, fabric tubes etc. and once the inflator has finished deploying inflation gases the primary cushion chamber and the secondary cushion chamber may equalize in pressure with respect to each other due to the gas transfer between the primary cushion chamber and the secondary cushion chamber.

In another alternative exemplary embodiment, the secondary cushion chamber and the primary cushion chamber may be sealed from each other through a one-way valve disposed in the secondary cushion chamber, the primary cushion chamber or the diffuser tube.

Referring now to FIG. 12 yet another alternative exemplary embodiment is illustrated. Here a bracket or directing bracket 150 is secured to the B-pillar or other structural member of the vehicle proximate to the second or lower cushion chamber 50 of the secondary cushion chamber 44. Bracket 150 has a mounting flange portion 152 and a directing flange portion 154 wherein directing flange portion is disposed over a portion of the second or lower cushion chamber 50 of the secondary cushion chamber 44 and the bracket provides reaction surfaces in order to direct the same in the direction of arrow 156 during deployment of the primary and secondary cushion chambers. In accordance with an exemplary embodiment bracket 150 is used as directional reaction surface in order to increase the speed of the deployment of the second or lower cushion chamber 50 in the direction of arrow 156, which in this embodiment is towards the front of the vehicle. Moreover, bracket 150 also provides a means for directing the second or lower cushion chamber 50 in the direction of arrow 156. Of course, other directions are contemplated to be within the scope of exemplary embodiments of the present invention. Although, FIG. 12 shows the bracket being used with the embodiment wherein the upper or first cushion chamber 46 is directly mounted to the diffuser tube the bracket is contemplated to be used with any of the embodiments disclosed herein especially those directed to a non-contiguous or separate secondary cushion chamber.

Figure 13:
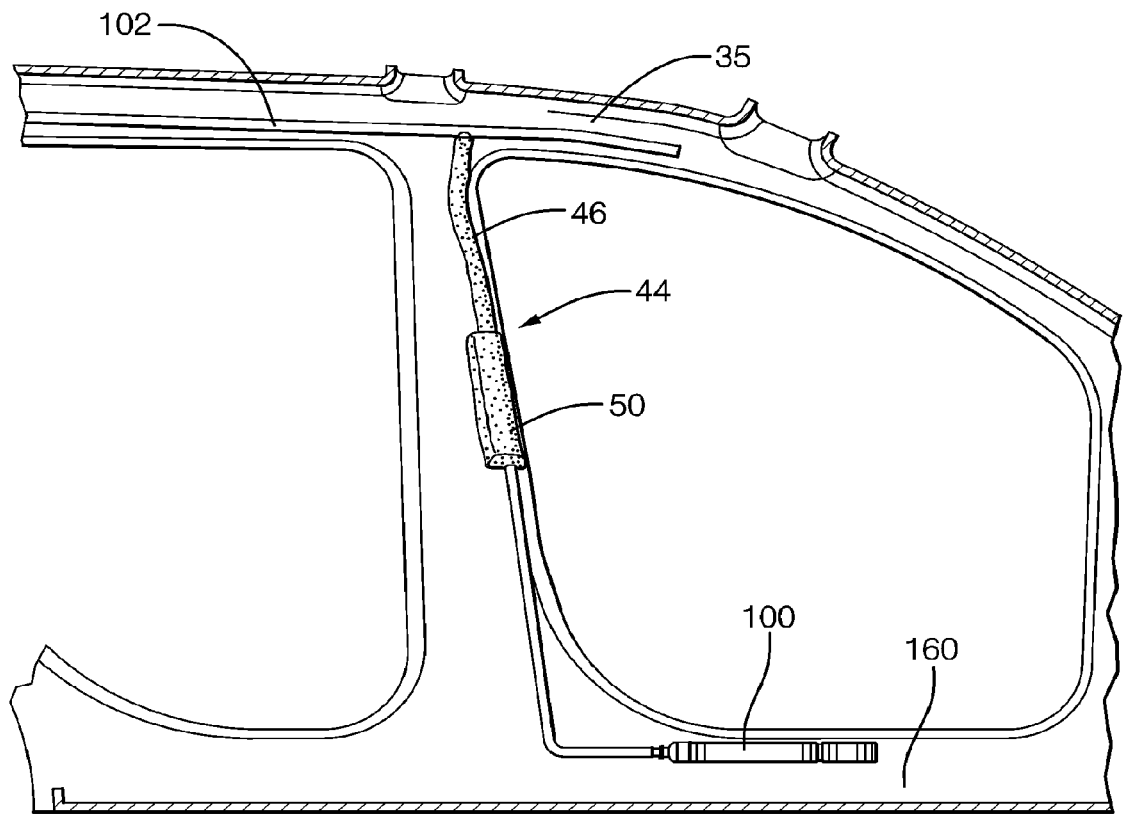
FIGS. 13-14 illustrate still another alternative exemplary embodiment of the present invention.
Figure 14:
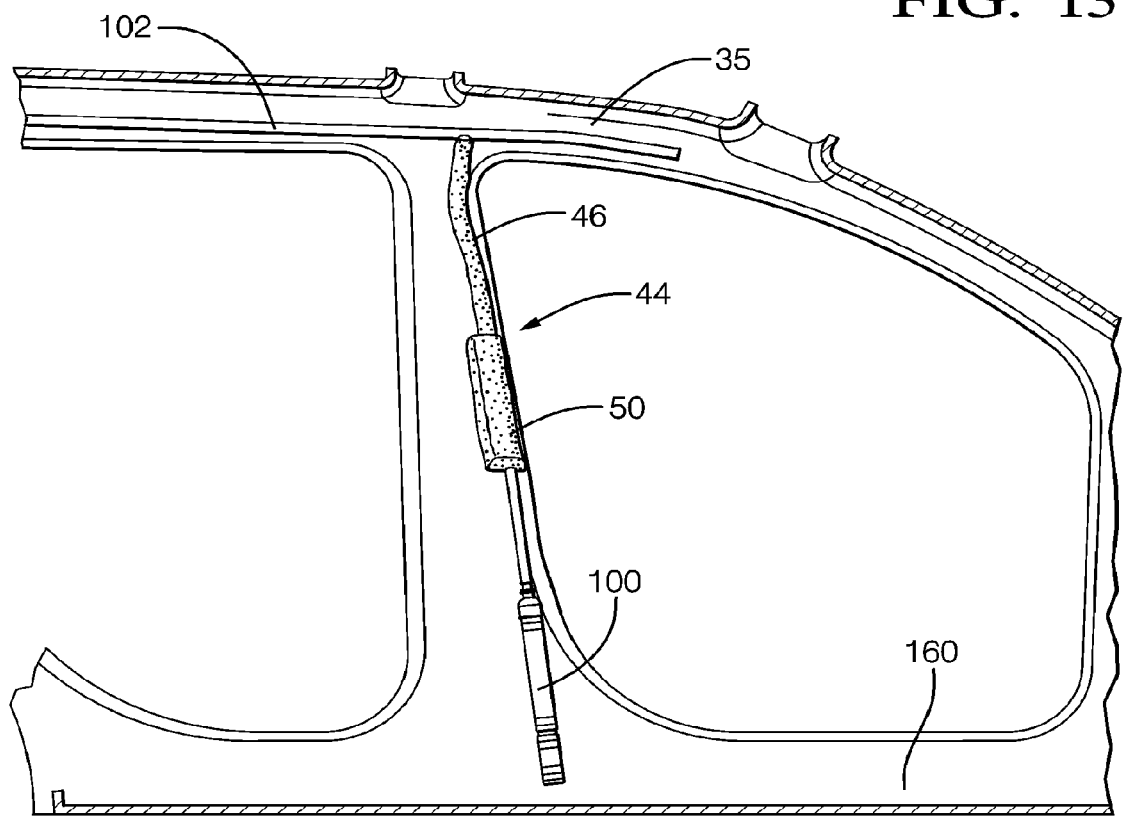

Referring now to FIGS. 13 and 14 still other alternative exemplary embodiments are illustrated. Here inflator 100 is mounted in rocker panel 160 (FIG. 13) or alternatively the B-pillar (FIG. 14) as opposed to the roof rail wherein a single inflator is still used to inflate or deploy the primary cushion chamber and the secondary cushion chamber and the secondary cushion chamber is provided with the appropriate amount of inflation gas at the predetermined time to position the secondary cushion chamber in the desired location and time during the activation event namely, fully deploying the secondary cushion chamber prior to fully deploying the primary cushion chamber.

Referring now to FIG. 15 a graph illustrating a plot of the internal pressure of a shoulder lobe cushion or secondary cushion chamber in accordance vs. a plot of the internal pressure of a curtain airbag or primary cushion chamber in accordance with an exemplary embodiment of the present invention is provided. The slope line identified Lobe Pressure (kPa) represents the secondary cushion chamber or shoulder lobe cushion while the slope line identified Main Curtain Pressure (kPa) represents the primary cushion chamber or main curtain airbag. In accordance with an exemplary embodiment of the present invention, the graph of FIG. 15 refers to the non-contiguous or separate secondary cushion chamber illustrated at least in FIGS. 4A, 4B, 7A-7C and FIGS. 16A-17C. As illustrated, the inflatable shoulder lobe feature or secondary cushion chamber clearly has a much steeper pressure slope during inflation as compared to the primary cushion chamber or main curtain airbag. Also, and as the time progresses the internal pressures start to move closer together due to the inflatable shoulder lobe feature or secondary cushion chamber being in fluid communication with the primary cushion chamber or main curtain airbag via the diffuser tube. Accordingly, the secondary cushion chamber will deploy to a fully deployed configuration faster than the primary cushion chamber.

Referring now to FIGS. 16 and 16A an alternative embodiment of the inflatable shoulder lobe feature or secondary cushion chamber 44 is illustrated. Again, FIG. 16 refers to the non-contiguous or separate secondary cushion chamber also illustrated at least in FIGS. 4A, 4B, 7A-7C wherein the secondary cushion chamber is mounted behind the trim of the B-pillar or other location of the vehicle. As illustrated, the secondary cushion chamber receives the inflation gases from the inflation via manifold 140 or any other suitable diffuser described herein. The manifold will have an orifice 170 that controls the deployment speed of the secondary cushion chamber and peak static pressure in the chamber. Here fluid communication is illustrated schematically with arrow 172. In this embodiment, the first section 46 or fill tube of the secondary cushion chamber routes the gas from the inflator into the main chamber or second section 50 of the secondary cushion chamber and thereafter during occupant loading the gas is transferred to the main curtain airbag or the primary cushion chamber. Here a funnel chamber 174 is provide to receive the gas from the first section or fill tube and the funnel chamber is the first portion to inflate causing the cushion to push through the B-pillar trim and expand or deploy the rest of the cushion chamber. As illustrated, the second section also has a pair of tethers 176 to further define the second section into a main chamber 180 and an upper chamber 182 and a lower chamber 184. Tethers 176 also have vent openings 186 to allow fluid communication between the funnel chamber, the main chamber and the upper and lower chambers. The pair of tethers control the thickness of the second section, divide the same into chambers and contain openings or vents for communication of the inflation gas. In addition, the second section also has vent openings 188 to allow venting of the inflation gases. The vents 188 along with first section 46 control the pressure and stiffness of the secondary cushion chamber.

Referring now to FIGS. 17A-17C an alternative embodiment of the inflatable shoulder lobe feature or secondary cushion chamber 44 is illustrated. Again, FIGS. 17A-17C refer to the non-contiguous or separate secondary cushion chamber also illustrated at least in FIGS. 4A, 4B, 7A-7C wherein the secondary cushion chamber is mounted behind the trim of the B-pillar or other location of the vehicle. As illustrated, the secondary cushion chamber receives the inflation gases from the inflator via the manifold, diffuser tube and first section 46. Here the secondary cushion chamber does not have any external vents and the interaction of the secondary cushion chamber and an arm 190 and shoulder 192 of an occupant are illustrated schematically. In FIG. 17A, at 16 msec from the firing of the inflator the secondary cushion chamber is deployed; however, no occupant loading is received. Here fluid communication or inflation is illustrated schematically with arrow 194. Thereafter and at 22 ms (FIG. 17B) some loading is received and a pressure sufficient to cause the inflation gases to travel up the first section 46 or fill tube of the secondary cushion chamber is shown by arrow 196. FIG. 17C shows more occupant loading at 35 msec and inflation gases travel up the first section 46 or fill tube of the secondary cushion chamber (arrow 196). As the pressure increases in the second section, the gas vents to the primary cushion chamber via first section 46.

Referring now to FIGS. 18A-18C an alternative embodiment of the inflatable shoulder lobe feature or secondary cushion chamber 44 is illustrated. Again, FIGS. 18A-18C refer to the non-contiguous or separate secondary cushion chamber also illustrated at least in FIGS. 4A, 4B, 7A-7C wherein the secondary cushion chamber is mounted behind the trim of the B-pillar or other location of the vehicle. As illustrated, the secondary cushion chamber receives the inflation gases from the inflation via the manifold, diffuser tube and first section 45. Here the secondary cushion chamber does not have an external vents and the interaction of the secondary cushion chamber and an arm 190 and shoulder 192 of an occupant are illustrated schematically. In FIG. 18A at 16 msec from firing of the inflator the secondary cushion chamber is deployed; however, no occupant loading is received. Here fluid communication or inflation is illustrated schematically with arrow 194. Thereafter and at 22 ms (FIG. 18B) some loading is received and a pressure sufficient to cause the inflation gases to travel up the first section 46 or fill tube of the secondary cushion chamber is shown by arrow 196. FIG. 18C shows more occupant loading at 35 msec and inflation gases travel up the first section 46 or fill tube of the secondary cushion chamber (arrow 196). As, the pressure increases in the second section the gas vents to the primary cushion chamber via first section 46.

In this embodiment, a pair of tethers 176 further define the second section into a main chamber 180 and an upper chamber 182 and a lower chamber 184. Tethers 176 also have vent openings 186 to allow fluid communication between the main chamber and the upper and lower chambers as illustrated by arrows 196. The pair of tethers control the thickness of the second section, divide the same into chambers and contain openings or vents for communication of the inflation gas. Since the second section in this embodiment does not have any external vent openings when the pressure increases in the secondary cushion chamber gases are eventually forced into the primary cushion chamber 180. While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the present application.

What is claimed is:

1. An inflatable cushion for a side of a vehicle, the inflatable cushion, comprising:

a primary cushion chamber inflatable to a first position, the primary cushion chamber having an upper edge portion, a lower edge portion, a first end portion and a second end portion; and a secondary cushion chamber inflatable to a second position, the secondary cushion chamber having a first section and a second section, the first section extending between the upper edge portion and the lower edge portion and the first section being located on the primary cushion chamber at a location spaced from both the first end portion and the second end portion and the second section extending from the first section towards either the first end portion or the second end portion and a portion of the second section being located below the lower edge portion when the secondary cushion chamber is in the second position;

wherein the primary cushion chamber and the secondary cushion chamber are each deployed by a single inflator and the secondary cushion chamber is fully deployed into the second position prior to the primary cushion chamber being fully deployed into the first position.

2. The inflatable cushion as in claim 1, wherein the primary cushion chamber has a plurality of cells and the secondary cushion chamber is integrally formed with the primary cushion chamber.

3. The inflatable cushion as in claim 1, wherein the secondary cushion chamber is separate with respect to the primary cushion chamber.

4. The inflatable cushion as in claim 3, wherein the second section of the secondary cushion chamber is configured to align with a shoulder of an occupant of the vehicle.

5. The inflatable cushion as in claim 1, wherein the secondary cushion chamber deploys without interference from a seat belt of the vehicle.

6. The inflatable cushion as in claim 5, wherein the primary cushion chamber has a plurality of cells and the secondary cushion chamber is integrally formed with the primary cushion chamber.

7. The inflatable cushion as in claim 1, wherein the second section of the secondary cushion chamber is configured to align with a shoulder of an occupant of the vehicle.

8. The inflatable cushion as in claim 1, wherein the first portion of the secondary cushion chamber extends from the upper edge and the second portion of the secondary cushion chamber is located below the lower edge when the secondary cushion chamber is inflated to the second position.

9. The inflatable cushion as in claim 1, wherein the first portion of the secondary cushion chamber passes through a tube defined by a sheath secured to an exterior surface of the primary cushion chamber.

10. An airbag module for a vehicle, comprising:
an inflatable cushion having a primary cushion chamber inflatable to a first position, the primary cushion chamber having an upper edge portion, a lower edge portion, a first end portion and a second end portion; and a secondary cushion chamber inflatable to a second position, the secondary cushion chamber having a first section and a second section, the first section extending between the tipper edge portion and the lower edge portion and the second section extending from the first section towards either the first end portion or the second end portion and a portion of the second section being located below the lower edge portion when the secondary cushion chamber is in the second position;
a single inflator for inflating the inflatable cushion; and
a gas diffusion means for delivering an inflation gas from the inflator to the primary cushion chamber and the secondary cushion chamber, wherein the gas diffusion means has a main tube section and an auxiliary tube section, the auxiliary tube section being in fluid communication with an end portion of the first section of the secondary cushion chamber and the main tube section has at least one flow restriction to direct inflation gases from the inflator into the auxiliary tube section.

11. The airbag module of claim 10, wherein the gas diffusion means further comprises a manifold for proportioning the inflation gas into the primary cushion chamber and the secondary cushion chamber and the second section of the secondary cushion chamber is configured to align with a pelvis of an occupant of the vehicle.

12. The airbag module of claim 10, wherein the gas diffusion means has a plurality of orifices for proportioning the inflation gas into the primary cushion chamber and the secondary cushion chamber and the first section of the secondary cushion chamber is secured about at least one of the plurality of orifices.

13. The airbag module as in claim 10, wherein the secondary cushion chamber is deployed to the second position prior to the primary cushion chamber being deployed to the first position and the internal pressure of the secondary cushion chamber increases at a greater rate of time than the internal pressure of the primary cushion chamber.

14. The airbag module as in claim 10, wherein the second section of the secondary cushion chamber extends toward the first end of the primary chamber and the inflator is located in any one of a roof rail, a B-pillar, an A-pillar or a rocker panel of the vehicle.

15. The airbag module as in claim 10, wherein the second section of the secondary cushion chamber extends toward the second end of the primary chamber and the secondary cushion chamber is deployed to the second position prior to the primary cushion chamber being deployed to the first position and the internal pressure of the secondary cushion chamber increases at a greater rate of time than the internal pressure of the primary cushion chamber and the internal pressure of the secondary cushion chamber reaches a higher peak pressure than the primary cushion chamber.

16. The airbag module as in claim 10, wherein the first portion of secondary cushion chamber extends from the upper edge and the second portion of the secondary cushion chamber is located below the lower edge when the secondary cushion chamber is inflated to the second position.

17. The airbag module as in claim 10, wherein the first portion of secondary cushion chamber passes through a tube defined by a sheath secured to an exterior surface of the primary cushion chamber.

18. The airbag module as in claim 10, wherein the auxiliary tube section has a stop and the end portion of the first section of the secondary cushion chamber is slidably mounted to the auxiliary tube section and the stop defines a limit of travel of the end portion on the auxiliary tube section.

19. The airbag module as in claim 10, wherein the secondary cushion chamber is mounted to a pillar of the vehicle and the secondary cushion chamber is located in an un-inflated state behind a trim piece of the pillar of the vehicle and the secondary cushion chamber deploys without interference from a seat belt mounted to the pillar.

20. An airbag module for a vehicle, comprising:
an inflatable cushion having a primary cushion chamber inflatable to a first position, the primary cushion chamber having an upper edge portion, a lower edge portion, a first end portion and a second end portion; and a secondary cushion chamber inflatable to a second position, the secondary cushion chamber having a first section and a second section, the first section extending between the upper edge portion and the lower edge portion and the second section extending from the first section towards either the first end portion or the second end portion or towards both the first end portion and the second end portion and a portion of the second section being located below the lower edge portion when the secondary cushion chamber is in the second position;
a single inflator for inflating the inflatable cushion; and a gas diffusion means for delivering an inflation gas from the inflator to the primary cushion chamber and the secondary cushion chamber; wherein the second section of the secondary cushion chamber is mounted proximate to a bracket for directing the second section of the secondary cushion chamber into the second position during deployment of the secondary cushion chamber.

21. The airbag module as in claim 10, wherein the second section of the secondary cushion chamber is mounted proximate to a bracket for directing the second section of the secondary cushion chamber into the second position during deployment of the secondary cushion chamber and the second section of the secondary cushion chamber is configured to align with a shoulder of an occupant of the vehicle.

22. The airbag module as in claim 10, wherein the second section of the secondary cushion chamber is configured to align with a pelvis of an occupant of the vehicle.

23. A method of providing side protection to an occupant of a vehicle, the method comprising:
inflating an inflatable cushion with a single inflator, the inflatable cushion having a primary cushion chamber inflatable to a first position, the primary cushion chamber having an upper edge portion, a lower edge portion, a first end portion and a second end portion; and a secondary cushion chamber inflatable to a second position, the secondary cushion chamber having a first section and a second section, the first section extending between the upper edge portion and the lower edge portion and the second section extending from the first section towards either the first end portion or the second end portion and a portion of the second section being located below the lower edge portion when the secondary cushion chamber is in the second position and wherein the secondary cushion chamber is mounted to a pillar of the vehicle and the secondary cushion chamber is located in an un-inflated state behind a trim piece of the pillar of the vehicle and the second section of the secondary cushion chamber is mounted proximate to a bracket for directing the second section of the secondary cushion chamber into the second position during deployment.

24. The method as in claim 23, wherein the primary cushion chamber has a plurality of cells and the secondary cushion chamber is integrally formed with the primary cushion chamber.

25. The method as in claim 23, wherein the primary cushion chamber has a plurality of cells and the secondary cushion chamber is non-contiguous to the primary cushion chamber and the second section of the secondary cushion chamber is configured to align with a shoulder of an occupant of the vehicle.

26. The method as in claim 23, wherein the first section of the secondary cushion chamber is configured to expand during deployment of the secondary cushion without any additional downward deployment.

27. The method as in claim 23, wherein the secondary cushion chamber is fully deployed to the second position prior to the primary cushion chamber being fully deployed to the first position.

28. A method of providing side protection to an occupant of a vehicle, the method comprising:
 inflating an inflatable cushion with a single inflator, the inflatable cushion having a primary cushion chamber inflatable to a first position, the primary cushion chamber having an upper edge portion, a lower edge portion, a first end portion and a second end portion; and a secondary cushion chamber inflatable to a second position, the secondary cushion chamber having a first section and a second section, the first section extending between the upper edge portion and the lower edge portion and the second section extending from the first section towards either the first end portion or the second end portion or towards both the first end portion and the second end portion and a portion of the second section being located below the lower edge portion when the secondary cushion chamber is in the second position; wherein the single inflator provides inflation gases to the primary cushion chamber and the secondary cushion chamber via a diffuser tube and the secondary chamber is separate from the primary cushion chamber and the diffuser tube has a main tube section and an auxiliary tube section, the auxiliary tube section being in fluid communication with an end portion of the first section of the secondary cushion chamber and the main tube section has at least one flow restriction to direct inflation gases from the inflator into the auxiliary tube section.

29. The method as in claim 28, wherein the auxiliary tube section has a stop and the end portion of the first section of the secondary cushion chamber is slidably mounted to the auxiliary tube section and the stop defines a limit of travel of the end portion on the auxiliary tube section.

\* \* \* \* \*